United States Patent
Kuo et al.

(10) Patent No.: US 11,843,160 B2
(45) Date of Patent: Dec. 12, 2023

(54) ANTENNA-IN-PACKAGE TRANSCEIVER MODULE

(71) Applicant: Google LLC, Mountain View, CA (US)

(72) Inventors: Jerry Weiming Kuo, Sunnyvale, CA (US); Peter Joseph Bevelacqua, Sunnyvale, CA (US); Leigh Margaret Cormie, Mountain View, CA (US)

(73) Assignee: Google LLC, Mountain View, CA (US)

( * ) Notice: Subject to any disclaimer, the term of this patent is extended or adjusted under 35 U.S.C. 154(b) by 360 days.

(21) Appl. No.: 17/392,089

(22) Filed: Aug. 2, 2021

(65) Prior Publication Data

US 2022/0069439 A1 Mar. 3, 2022

Related U.S. Application Data

(60) Provisional application No. 63/070,118, filed on Aug. 25, 2020.

(51) Int. Cl.
*H04B 1/40* (2015.01)
*H01Q 1/22* (2006.01)
(Continued)

(52) U.S. Cl.
CPC ......... *H01Q 1/2283* (2013.01); *H01Q 9/0407* (2013.01); *H04B 1/38* (2013.01)

(58) Field of Classification Search
CPC ...... H01Q 1/2283; H01Q 9/0407; H01Q 1/52; H04B 1/38; H04B 1/40
See application file for complete search history.

(56) References Cited

U.S. PATENT DOCUMENTS

| 8,444,043 B1 * | 5/2013 | Bernier | B23K 1/203 |
| | | | 228/179.1 |
| 11,387,214 B2 * | 7/2022 | Wang | H01L 24/97 |
| (Continued) | | | |

FOREIGN PATENT DOCUMENTS

KR 20100098153 9/2010

OTHER PUBLICATIONS

"Analysis of an Air-Spaced Patch Antenna Near 1800 MHZ", Akouemo Kengmo Kenfack, Hermine Nathalie, "Analysis of an air-spaced patch antenna near 1800 MHZ" (2011).Master's Theses (2009 -). Paper 112. http://epublications.marquette.edu/theses_open/112, 2011, 72 pages.

*Primary Examiner* — Andrew Wendell
(74) *Attorney, Agent, or Firm* — Colby Nipper PLLC

(57) ABSTRACT

The present disclosure describes aspects of an antenna-in-package (AiP) transceiver module and associated methods and systems. In aspects, an AiP transceiver module includes a substrate of dielectric material and first and second layers of conductive material disposed on respective surfaces of the substrate. The first layer of conductive material disposed on a first surface of the substrate includes an antenna element and antenna feed pad to which a contact of a transceiver integrated circuit die is coupled. The second surface of the substrate includes a dielectric interface area that is opposite to an area on the first surface of the substrate in which the antenna element is disposed and excludes the second layer of conductive material. The dielectric interface area of the substrate may effectively increase an amount of dielectric material below the antenna element, such that a volume of the dielectric material includes an air gap below the module.

20 Claims, 12 Drawing Sheets

(51) Int. Cl.
*H01Q 9/04* (2006.01)
*H04B 1/38* (2015.01)

(56) References Cited

U.S. PATENT DOCUMENTS

| | | | |
|---|---|---|---|
| 2009/0009408 A1* | 1/2009 | Rofougaran | H01Q 9/065 343/702 |
| 2018/0003754 A1* | 1/2018 | Schrattenecker | H01Q 1/2283 |
| 2018/0019216 A1* | 1/2018 | Hashemi | H01L 23/66 |
| 2018/0159203 A1 | 6/2018 | Baks et al. | |
| 2019/0260138 A1* | 8/2019 | Gu | H01Q 21/061 |
| 2020/0403299 A1* | 12/2020 | Gupta | H01L 23/5389 |
| 2021/0111134 A1* | 4/2021 | Chang | H01L 23/29 |
| 2021/0328367 A1* | 10/2021 | Tang | H01Q 9/285 |
| 2021/0384610 A1* | 12/2021 | Shams | H01Q 3/28 |

* cited by examiner

800 ─┐

```
┌─────────────────────────────────────────────────────────────┐
│ Fabricate a printed circuit board (PCB) with an antenna element on a first │
│ surface and a dielectric interface area on a second surface opposite to │
│ an area on the first surface in which the antenna element is fabricated │
│                             802                             │
└─────────────────────────────────────────────────────────────┘
                              │
                              ▼
┌─────────────────────────────────────────────────────────────┐
│      Attach a transceiver IC to the PCB with the antenna     │
│    element and the dielectric interface area to provide      │
│       an antenna-in-package (AiP) transceiver module         │
│                             804                              │
└─────────────────────────────────────────────────────────────┘
                              │
                              ▼
┌─────────────────────────────────────────────────────────────┐
│     Attach solder balls to respective solder pads disposed   │
│       on the second surface of the AiP transceiver module    │
│                             806                              │
└─────────────────────────────────────────────────────────────┘
                              │
                              ▼
┌─────────────────────────────────────────────────────────────┐
│   Attach, using the solder balls, the AiP transceiver module to │
│  another PCB that includes a ground plane for the antenna element │
│                             808                              │
└─────────────────────────────────────────────────────────────┘
```

FIG. 8

ANTENNA-IN-PACKAGE TRANSCEIVER MODULE

RELATED APPLICATION

This application claims priority to U.S. Provisional Patent Application No. 63/070,118, filed Aug. 25, 2020, entitled "Antenna-in-Package Transceiver Module," the disclosure of which is incorporated by reference herein.

BACKGROUND

Electronic and computing devices often include a wireless radio module that enables data communication or user interaction through transmission and reception of wireless signals. Due to cost or size constraints of many devices, an antenna of the wireless radio module is typically implemented as a patch antenna fabricated on a circuit board of the device, which also provides a ground plane for the patch antenna. Generally, a bandwidth of the patch antenna corresponds to a distance between the patch antenna and the ground plane. When the patch antenna and ground plane are fabricated on the circuit board of the device, a thinness of the device circuit board limits this distance, which can reduce bandwidth or other performance metrics of the patch antenna.

SUMMARY

This disclosure describes aspects of an antenna-in-package (AiP) transceiver module and associated systems and methods. In some aspects, an AiP transceiver module includes a substrate of dielectric material and first and second layers of conductive material disposed on respective first and second surfaces of the substrate. The first layer of conductive material disposed on the first surface of the substrate includes an antenna element and an antenna feed pad to which a contact of a transceiver integrated circuit die is coupled. The second surface of the substrate includes a dielectric interface area that is opposite to an area on the first surface of the substrate in which the antenna element is disposed and excludes the second layer of conductive material. The dielectric interface area of the substrate may effectively increase an amount of dielectric material below the antenna element, such that a volume of the dielectric material between the antenna element of the AiP transceiver module and an underlying ground plane includes an air gap below the module. In aspects, using the air gap below the AiP transceiver module as the dielectric between the antenna element and the ground plane increases a bandwidth of the antenna element or improves performance of the AiP transceiver module.

In some aspects, an AiP transceiver module comprises a substrate of dielectric material and a first layer of conductive material disposed on a first surface of the substrate. The first layer of conductive material includes an antenna element, an antenna feed pad coupled to the antenna element, and a first set of pads coupled to respective ones of multiple vias that traverse the substrate. A transceiver integrated circuit (IC) die of the module has respective contacts that are coupled to the antenna feed pad and at least some of the first set of pads of the first layer of conductive material. A second layer of conductive material is disposed on a second surface of the substrate that is opposite to the first surface. The second layer of conductive material includes a second set of pads coupled to respective ones of the multiple vias that traverse the substrate. The second surface of the substrate also includes a dielectric interface area that is opposite to an area on the first surface of the substrate in which the antenna element is disposed. The second layer of conductive material is not disposed within the dielectric interface area of the second surface of the substrate.

In other aspects, an apparatus includes a printed circuit board (PCB) and an AiP transceiver module coupled to the printed circuit board by solder balls. The PCB includes a first set of pads disposed on a first layer of the PCB and a conductive area disposed between at least two pads of the first set of pads. The solder balls are coupled to the first set of pads, with each of the solder balls coupled to a respective one of the first set of pads disposed on the first layer of the PCB. The AiP transceiver module comprises a substrate of dielectric material, a transceiver IC die disposed on a first surface of the substrate, and an antenna element disposed on the first surface of the substrate and coupled to the transceiver IC die. The AiP transceiver module also includes a second set of pads disposed on a second surface of the substrate. The solder balls are coupled to the second set of pads, with each of the solder balls coupled to a respective one of the second set of pads disposed on the second surface of the substrate. A dielectric interface area of the second surface of the substrate is disposed between at least two pads of the second set of pads. The dielectric interface area of the second surface of the substrate is opposite an area on the first surface of the substrate in which the antenna element is disposed such that the antenna element is positioned over the conductive area of the PCB. By so doing, a volume of dielectric material between the antenna element of the AiP transceiver module and the conductive area of the PCB may include an air gap between the AiP transceiver module and the PCB. In aspects, a diameter of the solder balls may define at least a portion of a height of the volume of dielectric material between the antenna element and the conductive area (e.g., ground plane) of the PCB.

In other aspects, a method for implementing an AiP transceiver module comprises assembling and mounting the AiP transceiver module. A PCB is fabricated with an antenna element on a first surface of the PCB and a dielectric interface area on a second surface of the PCB. The dielectric interface area on the second surface is positioned opposite to an area on the first surface in which the antenna element is formed or fabricated. In some cases, the PCB for the AiP transceiver module is fabricated as a thin and low-cost two-sided printed circuit board having a core layer with a thickness between 90 micrometers and 210 micrometers. The method further comprises attaching a transceiver IC die to the PCB with the antenna element and the dielectric interface area to provide an antenna-in-package transceiver module. For example, respective power, ground, signal, and RF pads of the transceiver IC die are soldered to power, ground, signal, and antenna element feed pads of a top conductive layer of the PCB. Alternatively or additionally, other components (e.g., capacitors, resistors, or inductors) are soldered to other pads of the top layer of the PCB. Then, solder balls are attached to respective solder pads disposed on the second surface of the AiP transceiver module and the AiP transceiver module is attached, using the solder balls, to the PCB that includes the ground plane for the antenna element of the AiP transceiver module. After assembly, a volume of space for a dielectric material is provided between the dielectric interface area of the AiP transceiver module and the ground plane of the PCB. For example, the dielectric interface area below the antenna element enables the AiP transceiver module to use an air gap below the module, which in turn can improve performance (e.g., bandwidth) of the antenna element.

In an exemplarily embodiment, a diameter of the solder balls and a pitch of the solder pads can be selected to achieve a specific separation between the antenna element and a PCB (e.g., ground plane) to which the AiP transceiver module is coupled. In some cases, this is effective to establish a (predetermined or preconfigured) distance between the antenna element and a ground plane of the PCB and, thus, an amount of dielectric material below the antenna element. Alternatively or additionally, other components (e.g., capacitors, resistors, or inductors) are soldered to other pads of the bottom layer of the PCB.

The details of one or more implementations of an AiP transceiver module are set forth in the accompanying drawings and the following description. Other features and advantages will be apparent from the description, drawings, and the claims. This Summary is provided to introduce subject matter that is further described in the Detailed Description and Drawings. Accordingly, this Summary should not be considered to describe essential features nor used to limit the scope of the claimed subject matter.

BRIEF DESCRIPTION OF THE DRAWINGS

This specification describes aspects of an antenna-in-package (AiP) transceiver module with reference to the following drawings. The same numbers are used throughout the drawings to reference like features and components:

FIG. 8 illustrates an example method for implementing an AiP transceiver module in accordance with aspects described herein;

DETAILED DESCRIPTION

Figure 1:
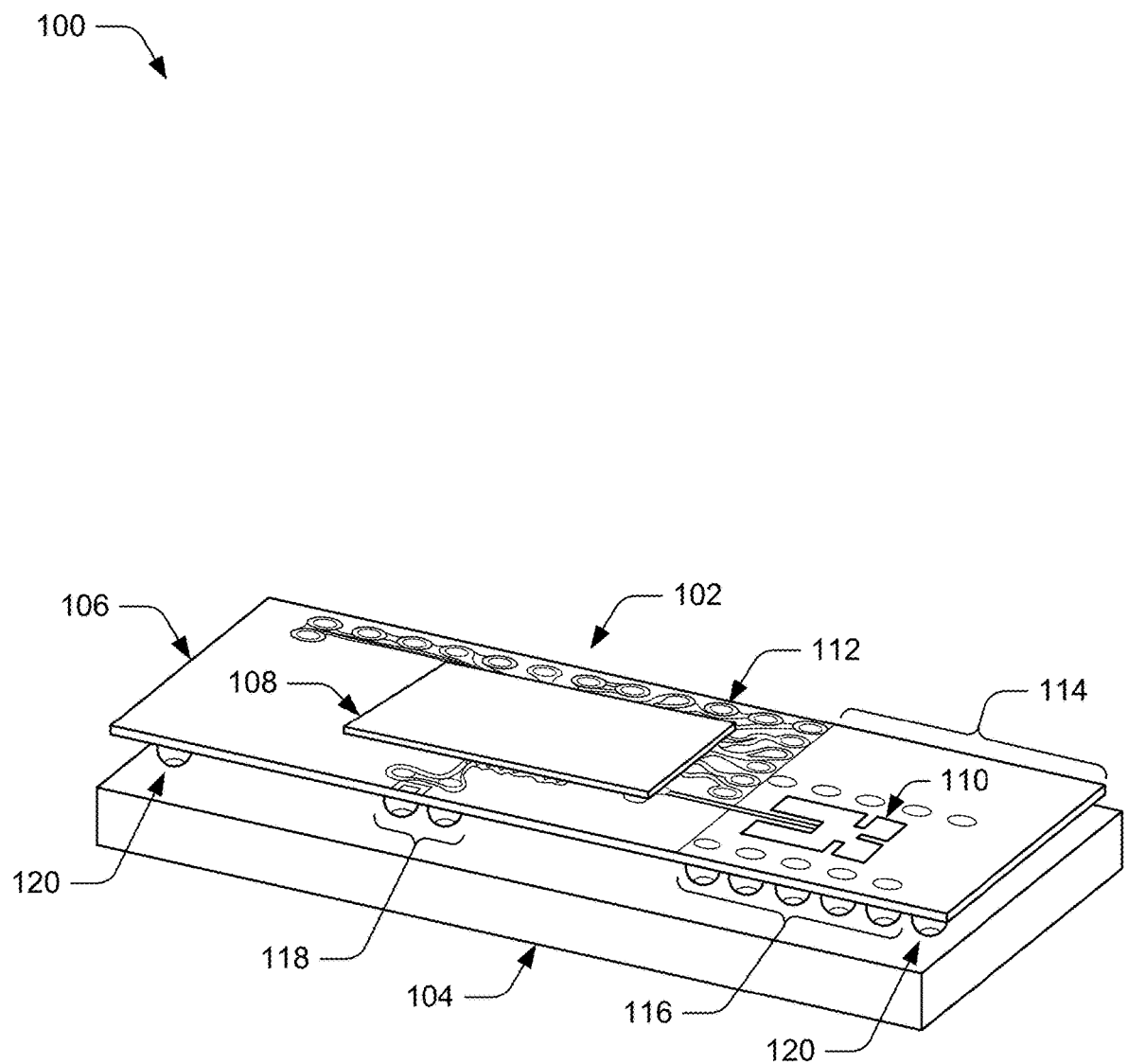
FIG. 1 illustrates a perspective view of an example AiP transceiver module implemented on a printed circuit board (PCB) in accordance with aspects described herein.

Some devices include a wireless radio module that implements frequency-modulation continuous wave (FMCW) radar, which can enable enhanced features for user interaction. These radar-enabled features include user presence detection, gesture interaction, motion detection, more-accurate user identification, spatial mapping, and so on. Generally, FMCW radar operates at a high frequency (e.g., above 6 GHz) and over a wide bandwidth, such as approximately ten to fifteen percent of the operating frequency. In some implementations, an FMCW radar module operates in a 60 GHz frequency band (e.g., a millimeter-wave (mmWave) frequency band) with a bandwidth of at least 6 GHz. Typically, these frequency and wide-band operational requirements preclude the use of simple antenna design techniques, such as preceding PCB-based patch antenna designs, resulting in the use of more complex and expensive antenna structures.

In contrast with the preceding antenna designs, this document describes apparatuses and techniques for an antenna-in-package transceiver module that may enable wide-band performance with a low-cost antenna-in-package architecture. In various aspects, the described antenna-in-package (AiP) transceiver module can be implemented with low-cost manufacturing techniques and provides wideband performance suitable for a variety of radar or communication applications, such as mmWave radar or wireless communication.

In some aspects, the described AiP transceiver module architecture includes a substrate on which first and second layers of conductive material are disposed on respective first and second surfaces (e.g., top and bottom) of the substrate. In some cases, the substrate includes a core layer of a PCB, and the first and second layers of conductive material correspond to top and bottom layers of the PCB. The first layer of conductive material on the first surface of the substrate includes pads for a transceiver integrated circuit (IC) and an antenna element to which the transceiver IC die is coupled. The second layer of conductive material on the second surface of the substrate includes pads for an intermediate interface, such as solder balls, which enable coupling of the AiP transceiver module to another substrate (e.g., carrier substrate or primary device PCB).

The second surface of the substrate also includes a dielectric interface area opposite to an area on the first surface in which the antenna element of the AiP transceiver module is disposed. This dielectric interface region of the second surface (e.g., bottom) of the substrate excludes the second layer of conductive material and enables the antenna element to use at least a portion of a volume of air between the AiP transceiver module and the other substrate as additional dielectric. As such, the AiP transceiver module may leverage the additional dielectric to increase an amount of effective dielectric between the antenna element and a conductive area of the other substrate, thereby enabling wide band performance of the antenna element. Additionally, the described AiP transceiver module architecture can be implemented with low complexity and thin PCB assemblies, which reduces costs associated with integrating one or more AiP transceiver modules in a device.

While features and concepts of the described apparatuses and techniques for an AiP transceiver module can be implemented in any number of different environments, systems, devices, and/or various configurations, various aspects of an AiP transceiver module are described in the context of the following example modules, configurations, systems, and devices.

Example Antenna-in-Package Module

FIG. 1 illustrates at 100 a perspective view of an example antenna-in-package (AiP) transceiver module 102 that is implemented on a printed circuit board 104 (PCB 104) in accordance with various aspects. Generally, the AiP transceiver module 102 is coupled to or mounted on a PCB associated with a device, such as a main logic board or carrier board, that includes a conductive area or surface that one or more antenna elements of the AiP transceiver module 102 can use as a ground plane for the transmission and/or reception of wireless signals. By so doing, the AiP transceiver module 102 can leverage a dielectric volume (e.g., air gap) between the antenna element of the module and the underlying ground plane of the other PCB to achieve improved performance characteristics (e.g., bandwidth) without the use of complex, expensive, or larger antenna structures.

As shown in FIG. 1, the AiP transceiver module 102 includes a substrate 106 of dielectric material, which may include a glass-reinforced epoxy laminate material. In some cases, the substrate 106 includes a layer of FR-4 laminate or another suitably rated glass epoxy material (e.g., G-10). The substrate 106 of the AiP transceiver modules includes one or more layers of conductive material that are formed or disposed on respective external surfaces of the substrate 106 and/or internal layers when the substrate 106 is implemented with multiple core and/or pre-resin-impregnated (pre-preg) layers. In other words, the AiP transceiver module 102 can be implemented as a printed circuit board assembly (PCBA) that includes a patterned circuit board (e.g., two-sided) and components coupled (e.g., soldered) to the circuitry patterned from conductive material on both sides. The layer of conductive material on a respective surface of the substrate 106 can include any suitable combination of conductive or structural features. Examples of these features include antenna elements, antenna-tuning features, signal traces (e.g., input/output (I/O) or radio frequency (RF) traces), vias, annular rings, solder pads, solder ball pads, test points, conductive areas (e.g., power or ground planes), or the like. Alternatively or additionally, a surface of the substrate may include keep-out areas or dielectric interface areas from which the conductive layer of materials or other conductive elements are excluded.

In this example, the substrate 106 of the AiP transceiver module includes a layer of conductive materials on both a top and a bottom surface (not shown) of the substrate 106. For example, the substrate 106 of the module can be implemented as a two-layer PCB with a core layer that is laminated with copper foil on both sides to provide conductive features as described herein. The layer of conductive material and/or features thereof can be formed or disposed using a variety of conductive materials, which may include one or more of copper (e.g., copper foil or cladding), gold, silver, tin, nickel, metallic compounds, conductive ink, or the like. In some cases, the features of the conductive layer (e.g., traces and antenna element) are formed or exposed on the substrate by etching away excess copper foil or copper cladding from the substrate. With respect to the top surface of the substrate 106, a first layer of conductive material (e.g., first PCB layer) includes solder pads for a wireless transceiver integrated circuit die 108 (transceiver IC die 108), an antenna element 110, and various power and I/O traces 112 that electrically couple, through vias, the transceiver IC die 108 to a second layer of conductive material on the bottom surface of the substrate. In some aspects, the first layer of conductive material includes a ground plane disposed under the transceiver IC die 108 that does not extend to an area 114 around the antenna element 110.

Generally, the transceiver IC die 108 and one or more antenna elements 110 of an AiP transceiver module 102 can be implemented to enable radar or wireless communication functionalities of a host device or system. For example, an AiP transceiver module 102 configured to implement mmWave radar enables radar-based user interactions and other radar features when integrated in any suitable device (e.g., user device or network device), system, or apparatus. Although this disclosure frequently refers to radar and radar-based features, radar is an example wireless technology that is discussed for simplicity, but the AiP transceiver module and associated architecture discussed herein may also be applied to another wireless technology (e.g., 3rd Generation Partnership Project Long-Term Evolution (3GPP LTE), $5^{th}$ Generation New Radio (5G NR), $6^{th}$ Generation (6G), Ultra-Wideband (UWB), Wireless Local Area Network (WLAN), near-field communication (NFC), a personal area network (PAN), IEEE 802.15.4, ZigBee, Thread, or the like) in a similar manner. As described, the transceiver IC die 108 includes circuitry for and/or implements both transmit and receive functionalities to enable radar or wireless communication. Alternatively, the AiP transceiver module may include any suitable combination of separate ICs, circuitry, or modules that implement respective transmit or receive functionalities to enable various aspects of radar-enabled features or wireless communication.

In various aspects, the IC transceiver die 108 is electrically coupled to the power and I/O traces 112 of the substrate 106 and to at least one antenna element 110 through a respective RF feed (e.g., impedance controlled trace or microstrip) of the first layer of conductive material. Although not shown, the transceiver IC die 108 or the AiP transceiver module 102 may also include front-end circuitry that couples internal transceiver chains of the transceiver IC die 108 to RF feed of the antenna element 110 to facilitate various types of radar interactions and/or wireless communication. Alternatively or additionally, wireless functions of the transceiver IC die 108 may be implemented with discrete hardware-based components coupled to the substrate 106 or as an integrated wireless component, such as, and without limitation, a radar transceiver module, a field-programmable gate array (FPGA), an application-specific integrated circuit (ASIC), an application-specific standard product (ASSP), a system-on-chip (SoC), a system-in-package, a complex programmable logic device (CPLD), wireless communication co-processor, or the like.

The antenna elements 110 of an AiP transceiver module 102 may include a single antenna element 110 as shown or multiple antenna elements 110 that are configured similarly to or differently from each other. The antenna element(s) 110, front end circuitry, and transceiver IC die 108 can be tuned to, and/or be tunable to, one or more frequency bands defined by various wireless standards for radar use or wireless communication, and implemented by the transceiver IC die 108. By way of example and not limitation, the antenna element(s) 110, front end circuity, and transceiver IC die 108 can be implemented for transmit and/or receive operations in sub-gigahertz bands, sub-6 GHz bands, and/or above 6 GHz bands (e g., mmWave) that are defined by the 3GPP or other various standards (e.g., 57-64 GHz, 28 GHz, 38 GHz, 71 GHz, 81 GHz, or 92 GHz bands).

With respect to the bottom surface of the substrate 106, a second layer of conductive material (e.g., second PCB layer) includes power and I/O traces that couple vias from the top surface to respective solder ball pads (e.g., round or circular pads) on the bottom surface. Also formed from the second layer of conductive material, the solder ball pads can be coupled to the power traces, signal traces, a ground plane on the bottom surface, vias for ground stitching to the top surface (e.g., to ground pads or ground planes on the top surface), or the like. Some solder ball pads on the bottom surface may be configured to provide structural support for the AiP transceiver module 102 and do not connect with other conductive features. In the present example illustrated in FIG. 1, the second layer of conductive material on the bottom surface includes respective solder pads for a first set of solder balls 116 around the antenna element 110, a second set of solder balls 118 that electrically couple signal and/or power routings (e.g., power pads and ground pads) of the transceiver IC die 108 to the PCB 104, and a third set of solder balls 120 positioned proximate to the edges of the substrate 106 for structural support. Generally, conductive features on the bottom surface of the substrate or AiP PCB can be formed around or excluded from a dielectric interface area or region that enables the antenna element 110 to use dielectric material (e.g., air) below the AiP transceiver module 102. In this example, the first set of solder balls 116 proximate the antenna element 110 are also not coupled to signal traces or a ground plane on either the top or bottom of the substrate 106. Thus, a dielectric interface area or region defined generally under the antenna element 110 of the AiP transceiver module 102 may enable the antenna element 110 to reference a ground plane (not shown) implemented on the PCB 104 below the AiP transceiver module 102. This can be effective to increase an amount of dielectric between the antenna element 110 and the ground plane (e.g., substrate 106 and air gap), which can improve bandwidth performance of the antenna element 110.

Figure 2A:
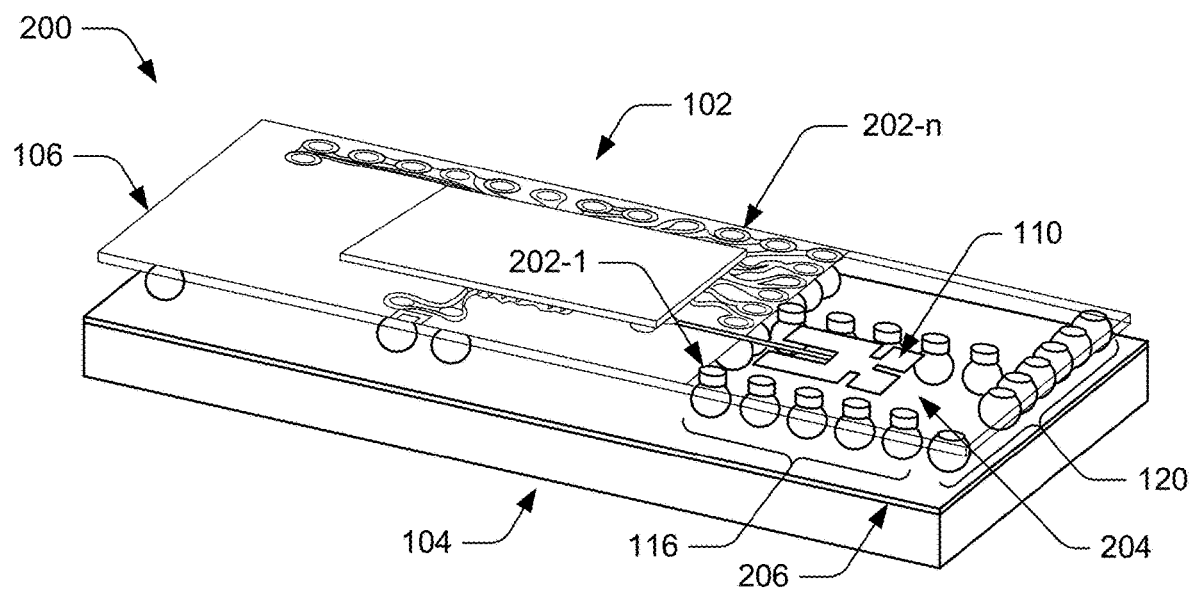
FIG. 2A illustrates a partial sectional view of the example AiP transceiver module and PCB of FIG. 1.

FIG. 2A illustrates at 200 a partial sectional view of the example AiP transceiver module and PCB of FIG. 1. In this view, a portion of the substrate 106 is omitted to show the solder balls positioned between the AiP transceiver module 102 and the PCB 104 to which the module is coupled. In aspects, the AiP transceiver module 102 is coupled to the PCB 104 of a host device by multiple solder balls as described herein. Alternatively or additionally, the AiP transceiver module may be coupled to and/or positioned relative the PCB 104 by a dielectric carrier (e.g., thermoplastic or polymer), stand-offs, adhesives, dielectric foam, solder bumps, copper pillars, or the like. For example, an AiP transceiver module 102 can be implemented as a flexible circuit PCB that is positioned over a PCB 104 or a suitable ground plane of a device (e.g., chassis or frame) with a thermoplastic carrier and an adhesive. Thus, the aspects described herein may be combined or varied to implement an AiP transceiver module 102 for a device or system in many ways.

As shown in FIG. 2A, the first or top layer of conductive material of the AiP transceiver module 102 includes the antenna element 110 and vias 202-1 through 202-n of conductive material that pass through the substrate 106. The vias 202 include vias for routing signals and power to the transceiver IC die 108 and other vias to which solder balls 116 are coupled around the antenna element 110. These vias 202 and the solder balls 116 are positioned proximate the antenna element and, in some cases, along one or more sides of a dielectric interface area 204 of the bottom of the substrate 106. Generally, the dielectric interface area 204 of the substrate 106 is opposite the antenna element 110 and excludes (e.g., as a keep-out area) conductive traces or components on the bottom side of the AiP transceiver module 102.

In some aspects, dielectric interface area 204 enables the antenna element 110 to use a volume of dielectric, such as air, below the AiP transceiver module 102 to effectively increase an amount, height, or volume of useable dielectric material between the antenna element 110 and ground plane 206 implemented on the PCB 104. Thus, a height or spacing between the antenna element 110 and the ground plane 206 of the PCB 104 may be selectively configured by varying a diameter of the solder balls that couple the AiP transceiver module 102 to the PCB 104, a stack-up of the substrate 106 (e.g., PCB layer configurations and overall height), and/or a stack-up of the PCB 104 (e.g., placing the ground plane on a top or inner layer).

Figure 2B:
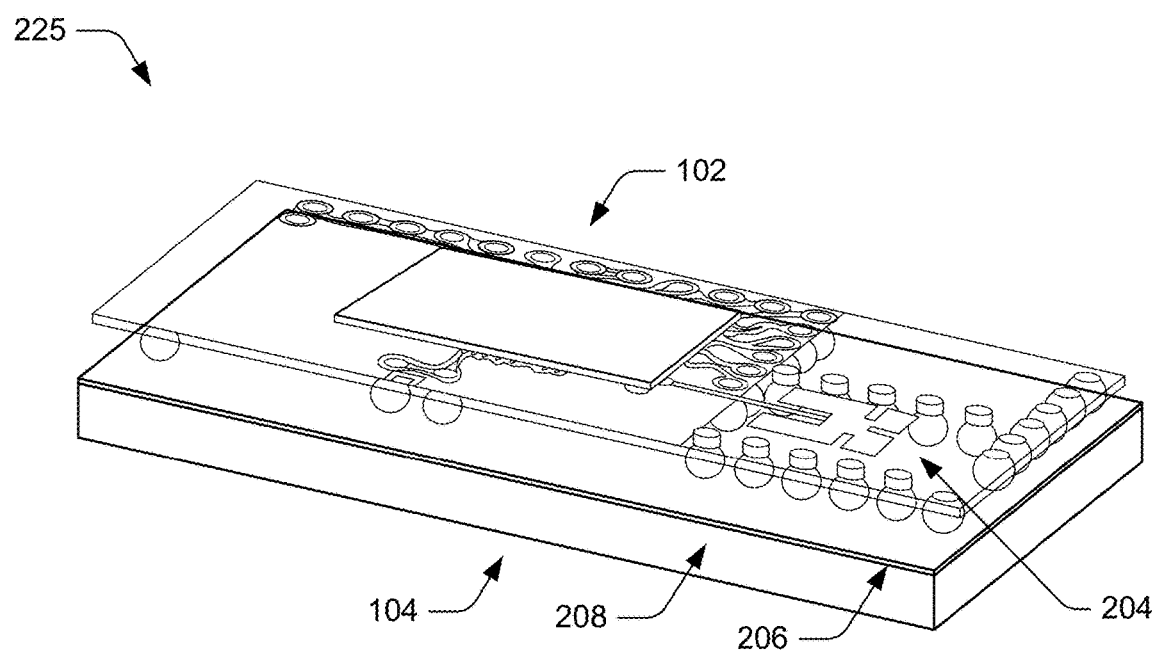
FIG. 2B illustrates another partial section view of the AiP transceiver module and PCB of FIG. 1.

FIG. 2B illustrates at 225 another partial sectional view of the AiP transceiver module and PCB of FIG. 1. In this view, the substrate 106 is omitted to show details of the PCB 104 on which the AiP transceiver module 102 is implemented. Generally, the PCB 104 may include a main logic board of a device or system in which the AiP transceiver module 102 is implemented. In other cases, the PCB 104 is implemented as a carrier PCB, peripheral PCB, or secondary PCB of the device or the system (e.g., bezel PCB or housing sensor PCB), which may be operably coupled to a main logic board. Similar to the AiP transceiver module 102, the PCB 104 can be implemented with standardized printed circuit board processes and materials, such as FR-4, which are low cost and do not increase costs of a device or system in which the AiP transceiver module 102 is implemented. In this example, the PCB 104 includes one or more layers of FR-4 laminate 208 and a ground plane 206, which is disposed on a top layer of the PCB 104 below the dielectric interface area 204 under the AiP transceiver module 102. Alternatively or additionally, the ground plane 206 of the PCB 104 may be implemented on an inner conductive layer and/or with slotting, slits, or other features useful to tune various performance metrics of the antenna element 110.

Figure 2C:
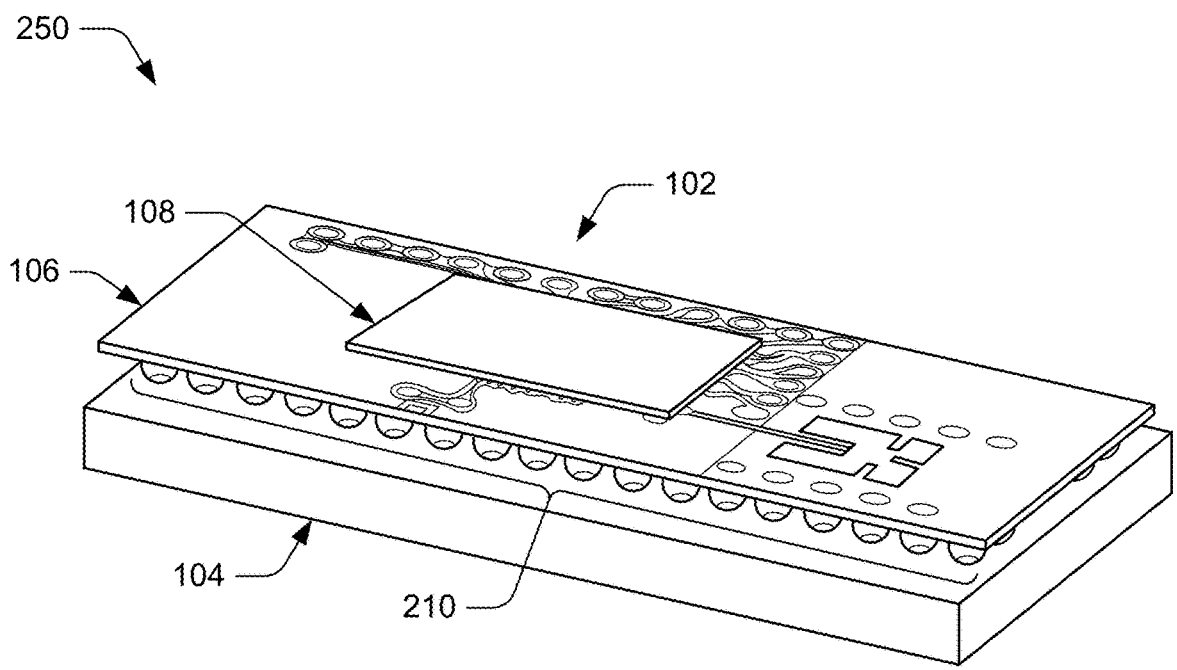
FIG. 2C illustrates a perspective view of another example AiP transceiver module implemented on a PCB in accordance with one or more aspects.

FIG. 2C illustrates at 250 a perspective view of another example AiP transceiver module implemented in accordance various aspects described herein. In this example, a set of multiple solder balls 210 couple the AiP transceiver module 102 to a PCB 104, such as a main logic board of a device or system. The solder balls 210 may include any suitable number of solder balls, which can be sized or placed to elevate the AiP transceiver module 102 over the PCB 104 on which the AiP transceiver module 102 is mounted (e.g., by reflow soldering). Thus, a diameter of the solder balls 210 (e.g., collapsed or un-collapsed diameter) can be selected to achieve a desired amount of spacing between the antenna element 110 of the AiP transceiver module 102 and the ground plane of the PCB 104. In some cases, an optimal diameter and spacing of the solder balls 210 is selected to optimize performance of the antenna element 110 and/or other antenna elements (not shown) of the AiP transceiver module 102.

In addition to a number of solder balls 210 used to provide electrical interconnects (e.g., power and I/O signal lines) between the substrate 106 and the PCB 104, the AiP transceiver module 102 may include any suitable number of additional solder balls 210 for structural support (e.g., increased rigidity and/or coplanarity of the AiP transceiver module 102). For example, the solder balls 210 may include the solder balls 116, 118, and/or 120 as described with reference to FIG. 1 for power and signal lines, as well as additional solder balls disposed along edges of the substrate 106, corners of the substrate 106 (e.g., solder balls 120) or underneath the transceiver IC die 108. As such, an AiP transceiver module 102 can be implemented with a set of multiple solder balls 210 (e.g., approximately 70 solder balls) that include a first subset of solder balls (e.g., 8-20 solder balls) that provide power and signal interconnects to the PCB 104 and a second subset of solder balls (e.g., 50-62 solder balls) for physical positioning, elevation (spacing), and/or structural support of the AiP transceiver module 102.

Figure 2D:
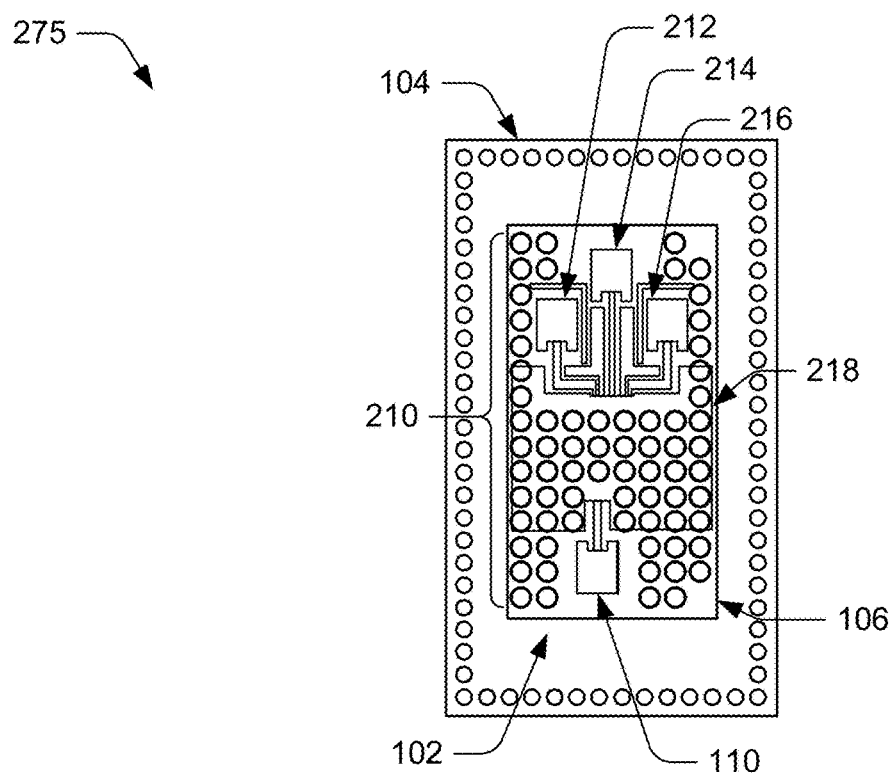
FIG. 2D illustrates a semi-transparent plan view of an example AiP transceiver module with multiple solder balls implemented in accordance with aspects described herein.

By way of example, consider FIG. 2D which illustrates at 275 a semi-transparent plan view (e.g., X-ray view) of an AiP transceiver module with solder balls implemented in accordance with one or more aspects. In this example, a plurality of solder balls 210, illustrated with heavier lineweight, is shown through an X-ray plan view of an AiP transceiver module 102 mounted on a PCB 104. As shown in FIG. 2D, the solder balls 210 may be placed under a footprint of the transceiver IC die 108 (not shown) and along respective edges and/or corners of the substrate 106. In accordance with various aspects of an AiP transceiver module, the solder balls 210 are not placed or disposed below antenna elements of the AiP transceiver module 102, which include antenna element 110 (e.g., transmit (TX)), antenna element 212 (e.g., receive (RX)), antenna element 214 (e.g., RX), and antenna element 216 (e.g., RX). In other words, the solder balls 210 can be placed outside of one or more dielectric interface areas on the bottom of the AiP transceiver module 102, which generally correspond to areas or regions beneath the antenna elements 110, 212, 214, and 216.

In aspects, the AiP transceiver module 102 also includes a ground plane 218 on a top and/or a bottom layer of the substrate 106. When implemented on a top layer of the substrate 106 and below the transceiver IC die 108, the ground plane 218 may fill areas around various power and signal traces that route from vias to the IC die. In some cases, the ground plane 218 on the top layer is coupled to a ground plane layer on the bottom layer by one or more vias (e.g., plane stitching) that traverse the substrate 106. Alternatively or additionally, solder pads for some of the solder balls 210 may also be formed in a ground plane on the bottom of the substrate (e.g., thermal reliefs), enabling the ground plane of the AiP transceiver module 102 to be electrically coupled to the PCB 104 through respective ones of the solder balls 210.

Figure 3A:
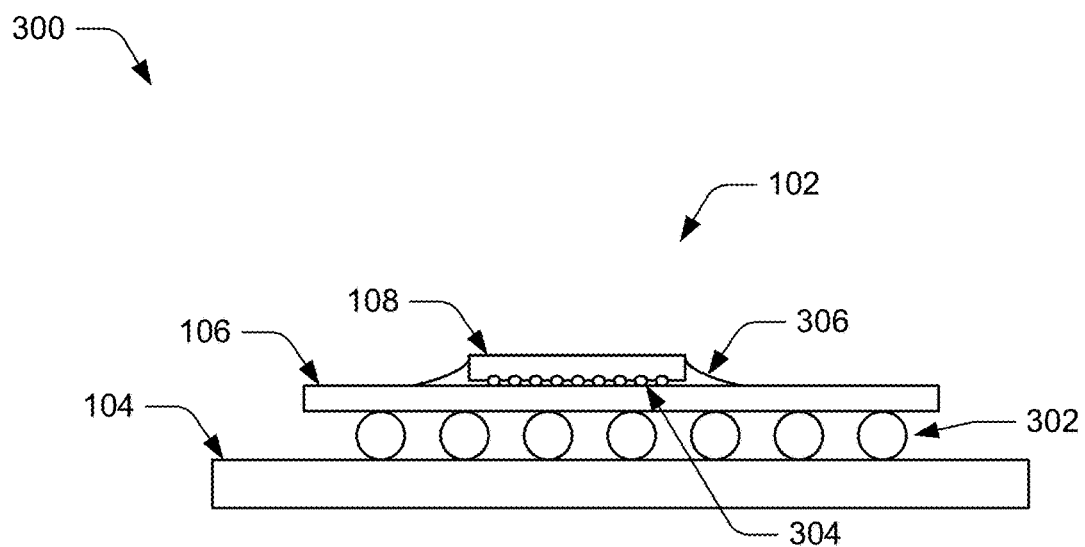
FIG. 3A illustrates a left elevational view of an example AiP transceiver module implemented in accordance with aspects described herein.

FIG. 3A illustrates at 300 a left elevational view of an example AiP transceiver module implemented in accordance with aspects described herein. In aspects, multiple solder balls 302, which may include solder balls 116, 118, 120, and/or 210, couple the AiP transceiver module 102 to the PCB 104 and may be selectively configured to position one or more antenna elements (not shown) of the AiP transceiver module 102 from a ground plane of the PCB 104. For example, a diameter of the solder balls 302 may include a diameter between 350 micrometers and 450 micrometers. A minimum or nominal pitch of pads for the solder balls 302 disposed on the bottom of the substrate 106, and the top layer of the PCB 104 can include a pitch between 450 micrometers and 550 micrometers. Respective pitch between the solder balls 302 may vary, as solder balls may be placed farther apart or toward an edge of the AiP transceiver module 102 to provide structural support or increase rigidity for the substrate 106 as needed.

With respect to the transceiver IC die 108, contacts 304 of the transceiver IC die 108 are soldered to respective solder pads formed on a first or top layer of circuitry disposed on the substrate 106. To support coupling to the substrate 106, the transceiver IC die 108 may include any suitable type of contacts 304, which may include leads, solder bumps, or a ball grid array (BGA, flip-chip configurations). In some cases, the transceiver IC die 108 is implemented as a small-outline no-leads (SON), quad-flat no-leads (QFN), or dual-flat no-leads (QFN) package that is soldered to respective pads on the substrate 106. Additionally, an epoxy 306 or other flowable adhesive can be applied to the transceiver IC die 108 to secure the IC to the substrate 106.

Figure 3B:
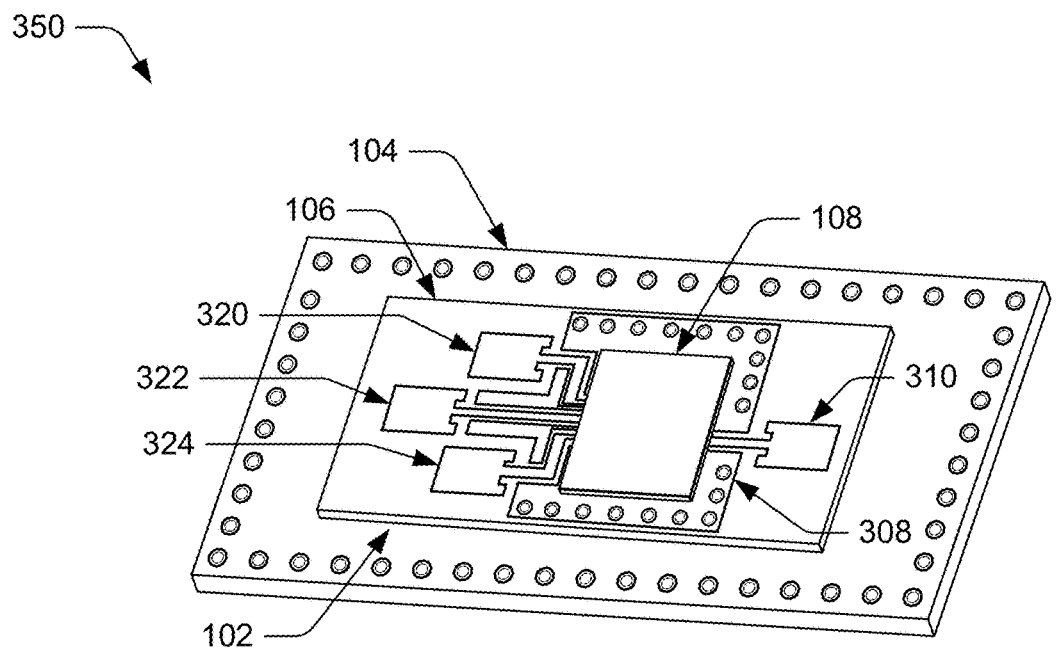
FIG. 3B illustrates a perspective view of AiP transceiver module disposed on a PCB in accordance with one or more aspects.

FIG. 3B illustrates at 350 a perspective view of an AiP transceiver module disposed on a PCB in accordance with one or more aspects. In this example, the AiP transceiver module 102 includes a transceiver IC die 108 that is implemented as a flip-chip BGA package soldered to the substrate 106 of the AiP transceiver module 102. A first or top conductive layer of the substrate includes a ground plane 308 that is disposed under and/or around the pads and circuitry coupled to the transceiver IC die 108. In some cases, the ground plane 308 includes vias or "stitching" to a ground plane on another layer of the substrate 106 or PCB of the AiP transceiver module 102. The ground plane on the other layer of the substrate 106 may have a different size or shape than that of the ground plane 308, or be similar in size or shape, such that the ground planes correspond to each other. Other vias proximate the transceiver IC die 108 route power and data signal lines from the top surface of the AiP transceiver module PCB to the bottom layer, where solder balls interface with corresponding power and data pads on the PCB 104.

In aspects, the AiP transceiver module 102 includes multiple antenna elements that are configured for transmitting signals, receiving signals (e.g., reflected radar signals), or both transmitting and receiving signals. In this example, the AiP transceiver module 102 is configured to implement radar and includes an antenna element 310 for transmitting wireless signals and multiple other antenna elements 320, 322, and 324 for receiving reflections of the wireless signals. Each of the antenna elements 310, 320, 322, and/or 324 may be configured similar to or differently from others of the antenna elements. Various configurations of an AiP transceiver module 102 antenna element include a microstrip antenna, a patch antenna, a rectangular patch antenna, a planar inverted-F antenna, a folded inverted conformal antenna (FICA), an inset fed patch antenna, and so on.

Figure 4A:
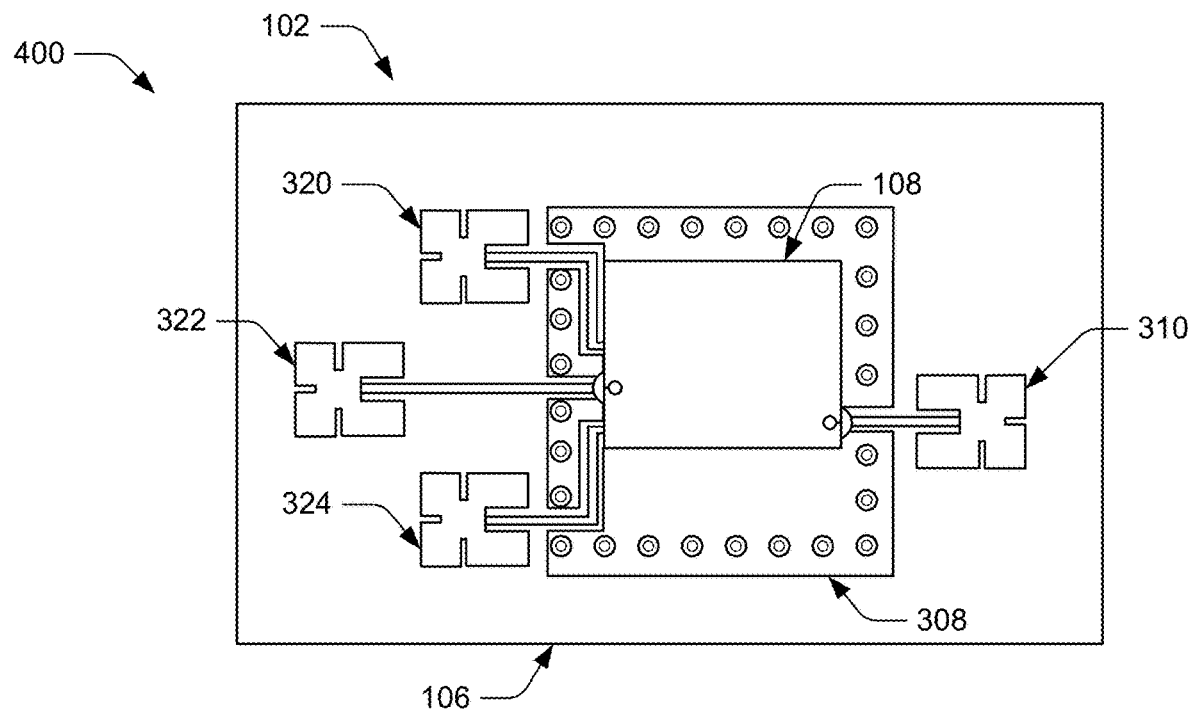
FIG. 4A illustrates a top plan view of a transceiver IC die and multiple antennas of an AiP transceiver module implemented in accordance with one or more aspects.

By way example, FIG. 4A illustrates a top plan view of an AiP transceiver module generally at 400. The AiP transceiver module 102 includes a transceiver IC die 108, a ground plane 308, and multiple antenna elements 310, 320, 322, and 324 implemented on the substrate 106. As described with reference to FIG. 3, the ground plane 308 may include multiple vias that electrically couple the ground plane 308, signal pads, or power pads on the top layer of the AiP transceiver module PCB to a corresponding ground plane, signal pads, or power pads on a bottom layer of the PCB. In this example, each of the antenna elements 310, 320, 322, and 324 are implemented as a respective instance of an inset fed patch antenna. To couple the antenna elements 310, 320, 322, and 324 to the transceiver IC die 108, the first or top conductive layer on the substrate 106 includes an antenna feed pad (not shown) and a controlled-impedance trace between the feed pad and an antenna element. When soldered to the substrate, respective RF contacts of the transceiver IC die 108 are coupled to the antenna feed pads to connect the transceiver IC die to the one or more antenna elements of the AiP transceiver module 102.

Figure 4B:
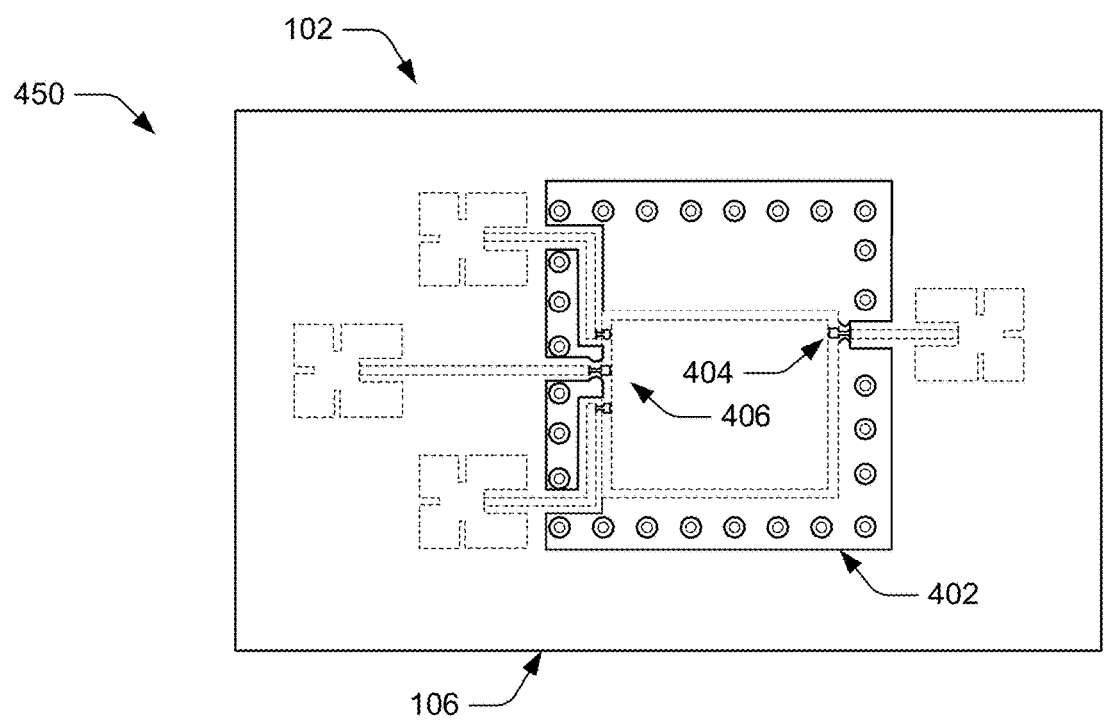
FIG. 4B illustrates a bottom plan view of the transceiver IC die and multiple antennas of the AiP transceiver module of FIG. 4A.

FIG. 4B illustrates at 450 a bottom plan view of the AiP transceiver module. As shown at 450, an AiP transceiver module may include a ground plane 402 on the bottom of the substrate 106. In aspects, the ground plane 402 is disposed below the transceiver IC die 108 and may have a similar layout pattern and/or dimensions as the ground plane 308 on the top side of the substrate 106 of the AiP transceiver module 102. For electrical continuity and interference suppression, some of the vias may couple the top ground plane 308 to the bottom ground plane 402. To complete grounding of the AiP transceiver module 102, the bottom ground plane 402 may include pads for solder balls that contact grounded pads on the PCB 104. Example RF feed pads 404 and 406 on the top layer are also illustrated here for clarity, as these pads reside below the transceiver IC die 108 and are obscured from view in FIG. 4A.

Figure 5A:
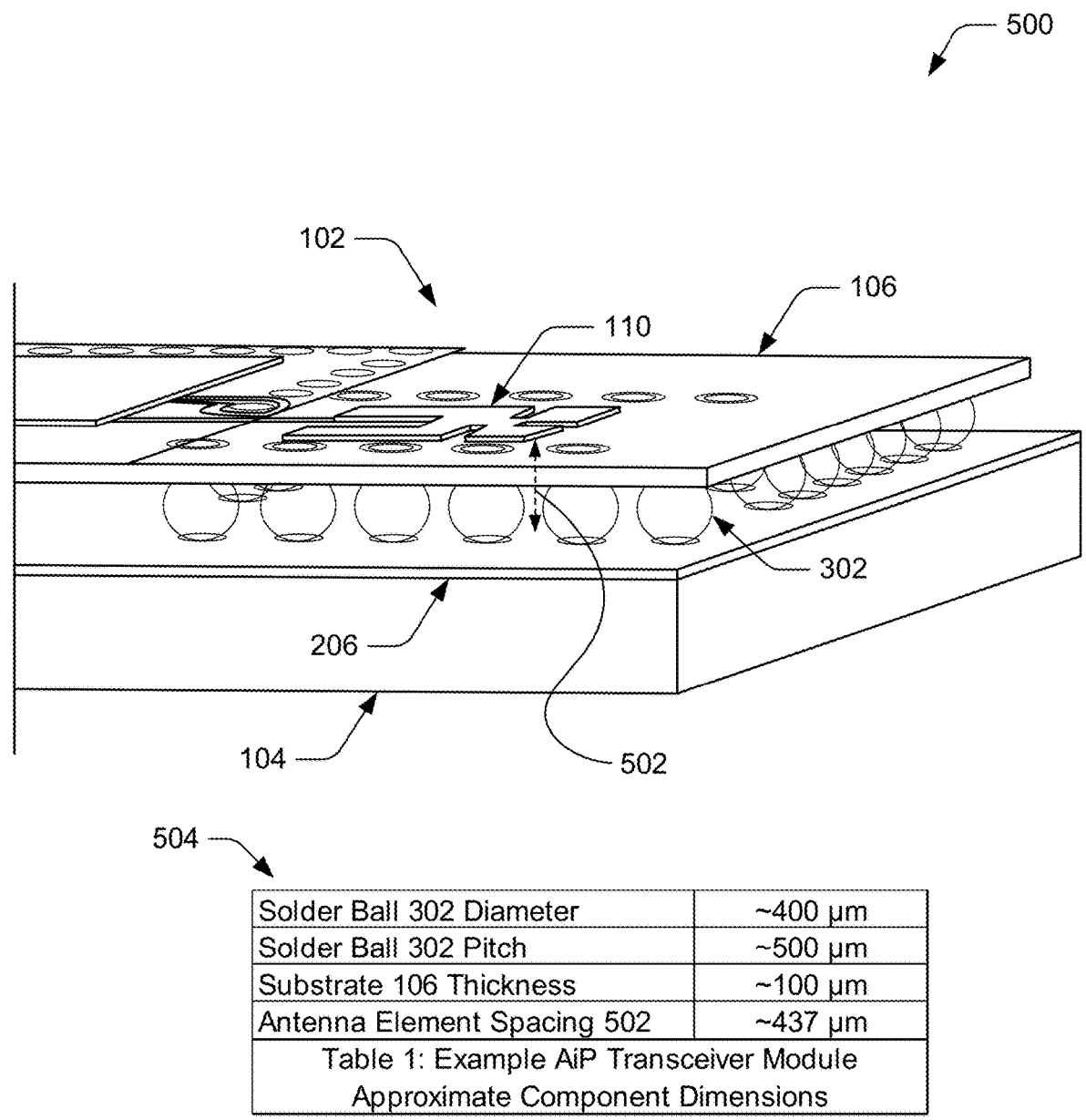
FIG. 5A illustrates an enlarged perspective view of an example AiP transceiver module coupled to a PCB in accordance with one or more aspects.

FIG. 5A illustrates at 500 an enlarged perspective view of an example AiP transceiver module coupled to a PCB in accordance with one or more aspects. In this example, an AiP transceiver module 102 is coupled to a PCB 104 by multiple solder balls 302, any of which may be implemented as described with reference to FIGS. 1-4B. Generally, a distance of spacing 502 (or separation) between an antenna element 110 on a top surface of the substrate 106 and a ground plane 206 of the PCB 104 is set based on a diameter of the solder balls 302 and a configuration of the substrate 106 (or PCB) of the AiP transceiver module 102. By selectively configuring the solder balls 302 and the substrate 106, the spacing 502, and therefore amount of dielectric material (e.g., FR-4 and air) between the antenna element 110 and ground plane 206, is configurable to tune or improve performance (e.g., bandwidth) of the AiP transceiver module 102.

In various aspects, the substrate 106 is implemented as a PCB core layer with respective copper circuitry formed on top and bottom surfaces from layers of copper foil or cladding to form a two-sided PCB. This two-layer PCB of the AiP transceiver module 102 can be implemented with any suitable thickness of core layer or copper cladding, which may include an overall thickness between 100 micrometers and 300 micrometers (e.g., 100 μm core with 37 μm copper on both sides). The dimensions and pitch (e.g., lateral spacing) of the solder balls 302 may also vary depending on implementations of the AiP transceiver module 102, with a diameter of the solder ball ranging from between 350 micrometers and 450 micrometers. The pitch of the solder balls 302 or pads for the solder balls can range between 450 micrometers and 550 micrometers in some embodiments.

As such, the spacing between the antenna element 110 and ground plane 206 of the PCB 104 is configurable and may range from approximately 350 micrometers to approximately 700 micrometers in some embodiments. In the context of FIG. 5A, consider a set of dimensions listed in Table 1 at 504 for components of the example AiP transceiver module 102 shown. With a solder ball diameter of 400 micrometers, solder ball pitch of 500 micrometers, and a substrate thickness of 100 micrometers, the antenna element 110 has approximately 437 micrometers of spacing from the ground plane 206. In other words, the AiP transceiver module architecture increases a volume of dielectric material below the antenna element 110 from 100 micrometers (e.g., substrate thickness) to approximately 437 micrometers, which improves performance of the AiP transceiver module 102 with minimal cost due to the low complexity of the AiP transceiver module 102 (e.g., two-sided PCB).

Figure 5B:
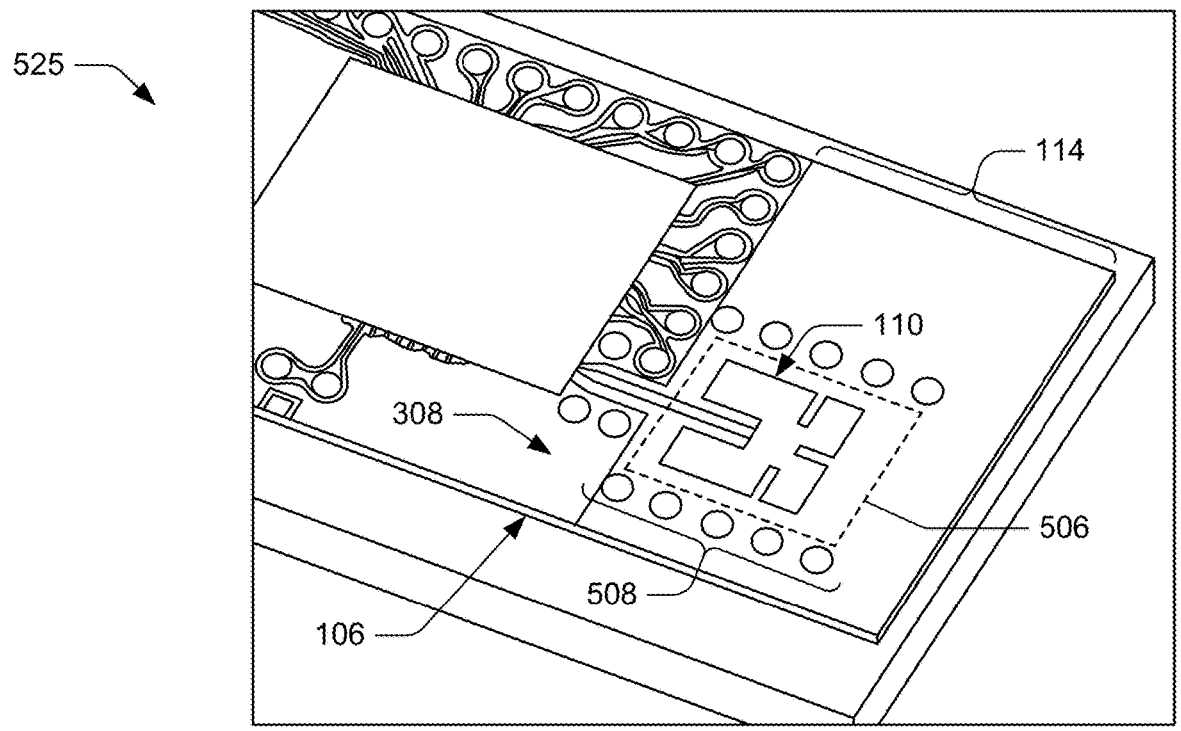
FIG. 5B illustrates an elevated partial perspective view of the example AiP transceiver module of FIG. 5A.

FIG. 5B illustrates at 525 an elevated perspective view of the example AiP transceiver module of FIG. 5A. This view illustrates various features of the substrate 106 in relation to the antenna element 110 and a dielectric interface area 506 of the substrate 106 that reside below the antenna element 110. As noted, a ground plane (e.g., ground plane 308) on the top layer of the substrate 106 may not extend to the area 114 proximate the antenna element 110. In aspects, vias may be disposed along one or more sides of the antenna element 110, such as vias 508, which may be coupled to solder ball pads on the bottom side of the substrate 106. In some cases, the vias 508 or other vias placed proximate the antenna element 110 can be used to tune or adjust performance of the antenna element 110 over various ranges of frequencies.

Generally, the dielectric interface area 506 of the substrate includes an area or region on the bottom of the substrate that is opposite to an area on the top surface of the substrate in which the antenna element is disposed. Alternatively, the substrate 106 may include a dielectric interface volume that extends from an area around the antenna element (e.g., similar to the dielectric interface area 506) through the substrate 106 to a dielectric material below the AiP transceiver module 102 (e.g., air). To enable the antenna element 110 to reference the ground plane below, the dielectric interface area 506 of the AiP transceiver module 102 does not include conductive material (e.g., traces or vias) or components (e.g., solder balls) between the bottom of the substrate 106 and the ground plane. In some embodiments, however, the dielectric interface area on the bottom of the substrate or volume below may include other dielectric material, which may include one or more of silk screen, solder mask, solder resist, foam, adhesive, mylar, or the like.

Figure 5C:
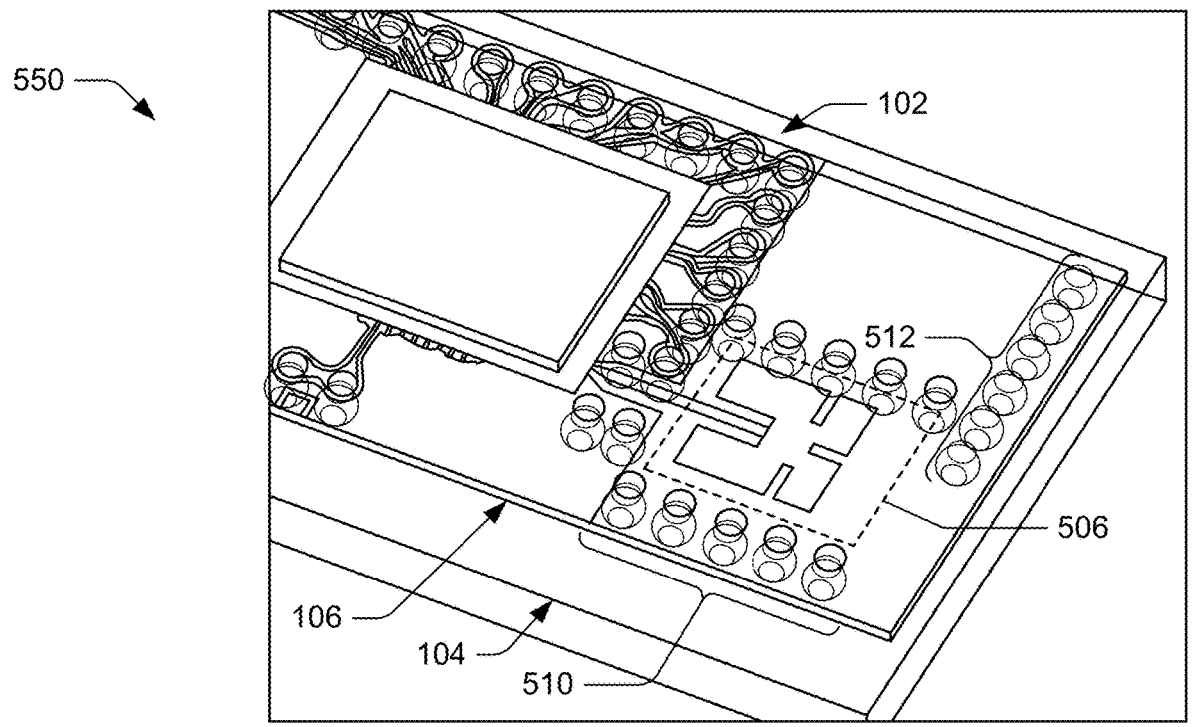
FIG. 5C illustrates a partial sectional view of the example AiP transceiver module of FIG. 5B.

FIG. 5C illustrates at 550 a partial sectional view of the example AiP transceiver module of FIG. 5B. To further illustrate the dielectric interface area 506 and volume below, this view shows a space between the AiP transceiver module 102 and the PCB 104 as configured in accordance with one or more aspects. In this example, multiple solder balls 510 are coupled between respective pads of on the bottom of the substrate 106 and a top layer of the PCB 104. These solder balls 510 are also coupled to the vias 508 as described with reference to FIG. 5B, though other embodiments of the AiP transceiver module 102 may not include vias proximate the antenna element 110. The AiP transceiver module 102 may also include other multiple vias, such as vias 512, proximate an edge or corner of the substrate 106 to provide support for the AiP transceiver module 102 or increase rigidity of the substrate 106.

Figure 6A:
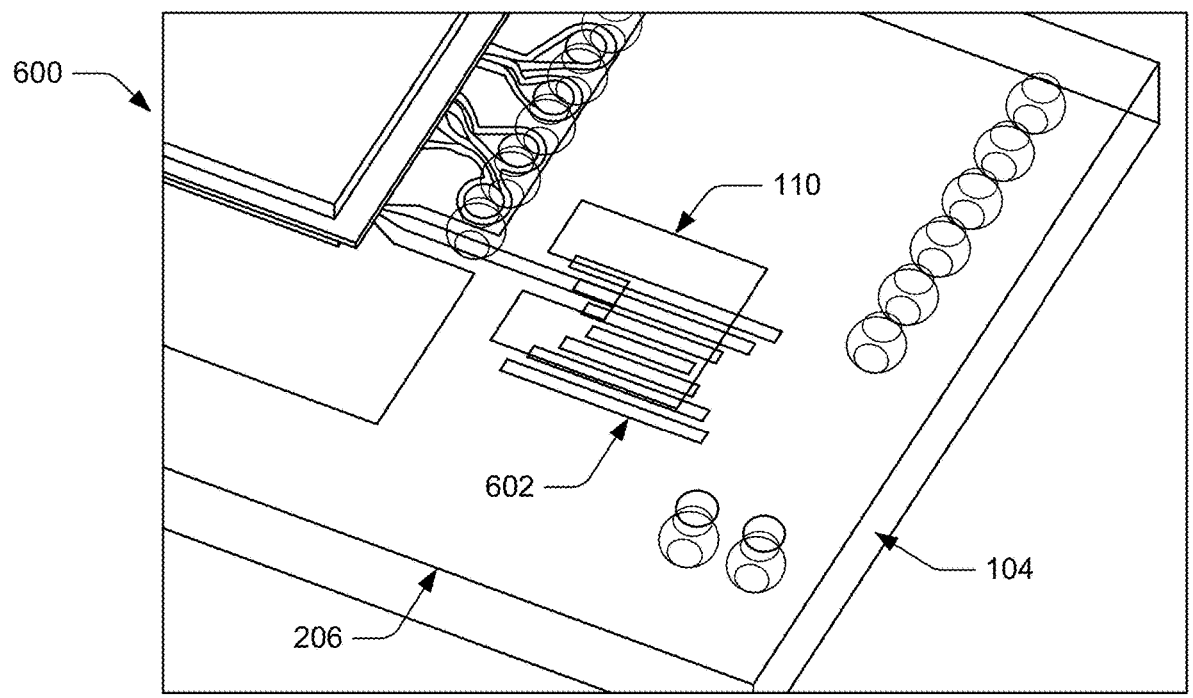
FIG. 6A illustrates a partial sectional view of an example AiP transceiver module mounted on a PCB with ground plane slots implemented in accordance with one or more aspects.
Figure 6B:
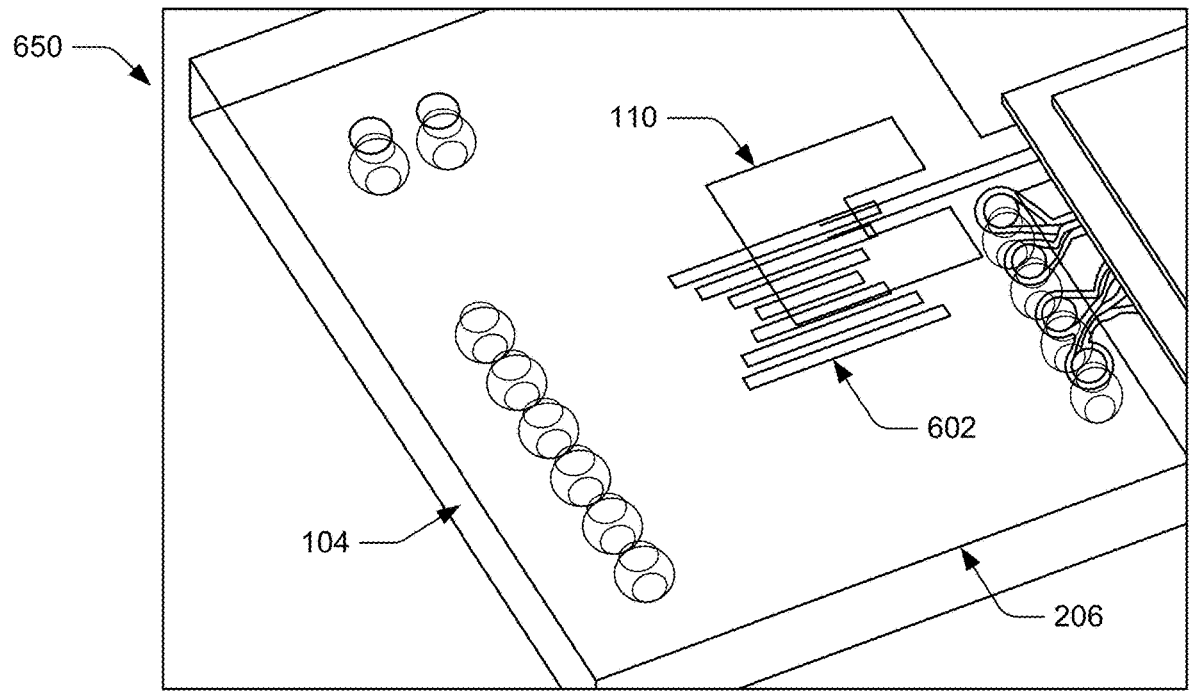
FIG. 6B illustrates another partial sectional view of the example AiP transceiver module of FIG. 6A.

FIG. 6A illustrates at 600 a partial sectional view of an example AiP transceiver module mounted on a PCB with ground plane features implemented in accordance with one or more aspects. In some aspects, a top layer or ground plane 206 of the PCB 104 may include features useful to tune or improve performance of the antenna element 110 of the AiP transceiver module 102. In this example, multiple slots 602 (e.g., removed sections of copper cladding) of differing lengths are formed in the ground plane 206 of the PCB 104 below the antenna element 110. The slots 602 can be useful to tune or improve performance of the antenna element 110, such as providing an increased bandwidth over a range of frequencies. In other embodiments, other geometric shapes can be formed in or cut out of the ground plane 206, which may include same-length slots, curved slots, rectangles, crosses, circles, or ellipses. FIG. 6B illustrates at 650 another partial sectional view of the example AiP transceiver module of FIG. 6A. This view is provided from another reference to further illustrate the multiple slots 602 in relation to the antenna element 110 of the AiP transceiver module 102.

Figure 7A:
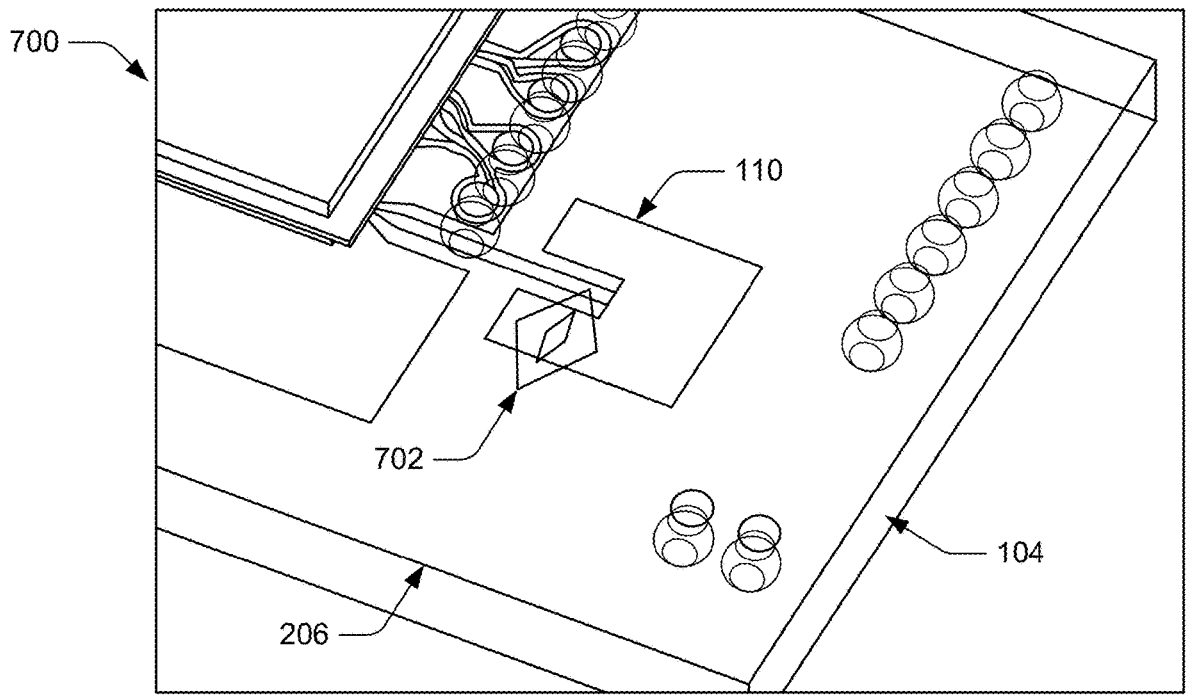
FIG. 7A illustrates a partial sectional view of an example AiP transceiver module mounted on a PCB with ground plane slots implemented in accordance with one or more aspects.
Figure 7B:
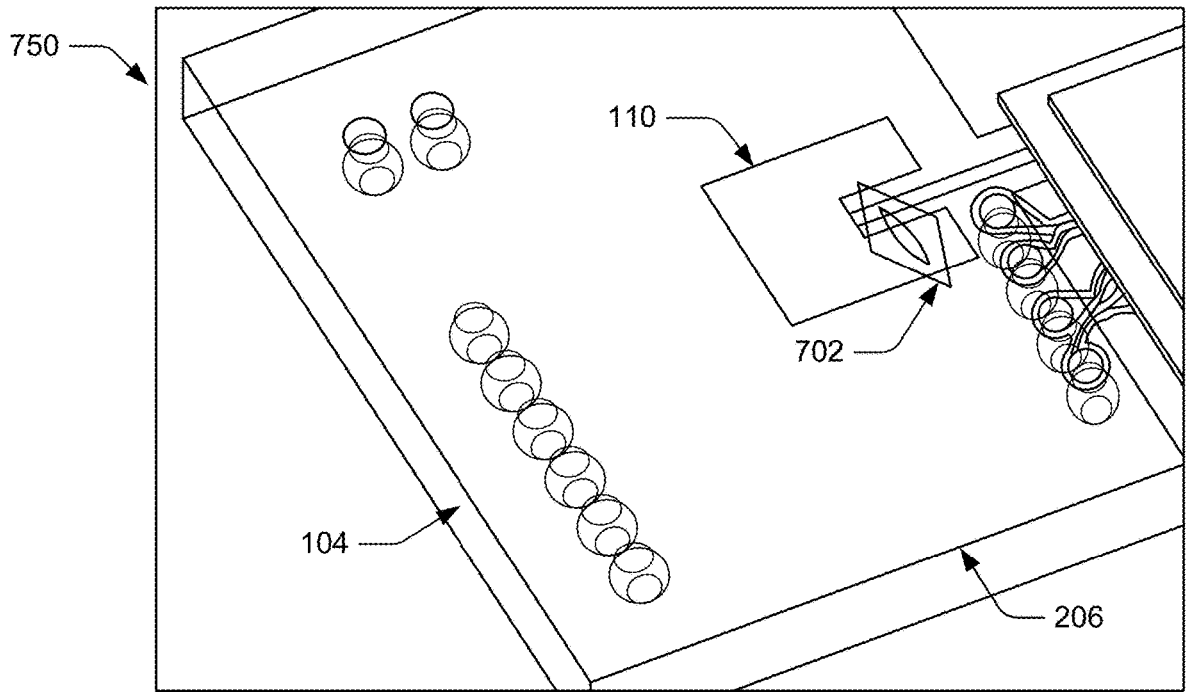
FIG. 7B illustrates another partial sectional view of the example AiP transceiver module of FIG. 7A.

FIG. 7A illustrates at 700 a partial sectional view of an example AiP transceiver module mounted on a PCB with other ground plane features implemented in accordance with one or more aspects. As described, the top layer or the ground plane 206 of the PCB 104 can include features useful to tune or improve performance of the antenna element 110 of the AiP transceiver module 102. In this example, a diamond-shaped slot 702 (e.g., removed sections of copper foil) is formed in the ground plane 206 of the PCB 104 below the antenna element 110. FIG. 7B illustrates at 750 another partial sectional view of the example AiP transceiver module of FIG. 7A. This view is provided from another reference to further illustrate the diamond slot 704 of the ground plane 206 in relation to the antenna element 110 of the AiP transceiver module 102. These are but a few example configurations of the described AiP transceiver module architecture, variations of which are described herein and/or enabled through different combinations of the described aspects.

Example Methods

Example methods 800 and 900 are described with reference to respective FIGS. 8 and 9 in accordance with one or more aspects of an antenna-in-package transceiver module and associated architecture. The order in which the method blocks are described is not intended to be construed as a limitation, and any number of the described method blocks can be skipped or combined in any order to implement a method or an alternate method. Generally, any assembly or use of the components, modules, methods, and operations described herein can be implemented using software, firmware, hardware (e.g., fixed logic circuitry), manual processing, or any combination thereof Some operations of the example methods may be described in the general context of executable instructions stored on computer-readable storage memory that is local and/or remote to a computer processing system, and implementations can include software applications, programs, functions, and the like.

FIG. 8 illustrates example method(s) 800 for implementing an AiP transceiver module as generally relating to assembling and mounting the AiP transceiver module. At block 802, a PCB is fabricated with an antenna element on a first surface of the PCB and a dielectric interface area on a second surface of the PCB. In some cases, the antenna element is formed as a portion of copper foil or copper cladding on a substrate of the PCB by etching away other portions of the foil or cladding (e.g., by negative or positive photoresist and etch operations). Alternatively or additionally, the antenna element or a layer of the antenna element can be formed through chemical vapor deposition (CVD) by which a layer of conductive material is applied to the substrate or a layer (e.g., copper or CVD) of the antenna element (e.g., for a multi-layer and/or multi-material antenna element). The dielectric interface area on the second surface is positioned opposite to an area on the first surface in which the antenna element is formed or fabricated. In some cases, the PCB for the AiP transceiver module is fabricated or constructed as a thin and low-cost two-sided printed circuit board having a core layer with a thickness between 90 micrometers and 210 micrometers.

At block 804, a transceiver IC die is attached to the PCB with the antenna element and the dielectric interface area to provide an antenna-in-package transceiver module. For example, respective pads of the transceiver IC die are soldered to power, signal, and antenna element feed pads of a top conductive layer of the PCB. Alternatively or additionally, other components (e.g., capacitors, resistors, or inductors) are soldered to other pads of the top layer of the PCB.

At block 806, solder balls are attached to respective solder pads disposed on the second surface of the AiP transceiver module. A diameter of the solder balls and a pitch of the solder pads can be selected to achieve a specific separation between the antenna element and a PCB to which the AiP transceiver module is coupled. In some cases, this is effective to establish a distance between the antenna element and a ground plane of the PCB and, thus, an amount of dielectric material below the antenna element. Alternatively or additionally, other components (e.g., capacitors, resistors, or inductors) are soldered to other pads of the bottom layer of the PCB.

At block 808, the AiP transceiver module is attached, using the solder balls, to the PCB that includes the ground plane for the antenna element of the AiP transceiver module. As described herein, the dielectric interface area below the antenna element enables the AiP transceiver module to use an air gap below the module, which in turn can improve performance (e.g., bandwidth) of the antenna element.

Figure 9:
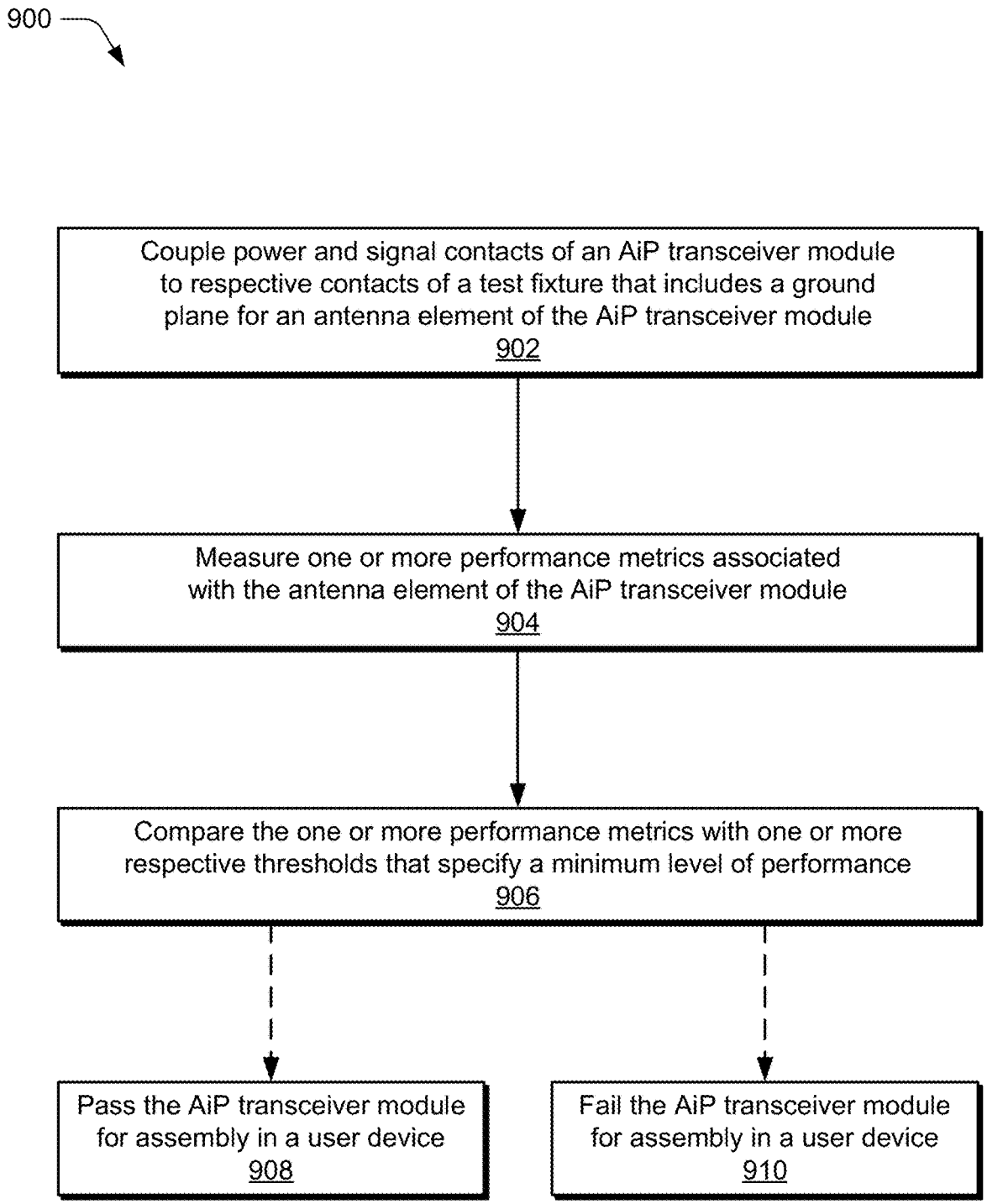
FIG. 9 illustrates an example method for measuring one or more performance metrics of an AiP transceiver module in accordance with aspects described herein.

FIG. 9 illustrates example method(s) 900 for measuring one or more performance metrics of an AiP transceiver module as generally related to verifying or qualifying performance of the AiP transceiver module. Although described with reference to a test fixture, operations described with respect to the method(s) 900 may be implemented by or with a host device in which an AiP transceiver module is implemented.

At block 902, power and signal contacts of an AiP transceiver module are coupled to respective contacts of a test fixture PCB that include a ground plane for an antenna element of the AiP transceiver module. Depending on a configuration of the AiP transceiver module, the test fixture may include one or more respective ground planes for one or more antenna elements of the AiP transceiver module under test. In some cases, the test fixture is configured to test an AiP transceiver module with solder balls installed, such that the solder balls are connected to the contacts of the text fixture. In other cases, the test fixture may include test probes that approximate a height of the solder balls, and the test probes contact or connect with signal and I/O pads on the bottom of the AiP transceiver module (e.g., pre-solder ball installation).

At block 904, one or more performance metrics associated with the antenna element of the AiP transceiver module are measured. In some cases, a transceiver IC die of the AiP transceiver module includes a test mode for verifying performance metrics of the AiP transceiver module. The performance metrics may include, for one or more frequency bands, a bit-error-rate, return loss, bandwidth, error vector magnitude (EVM), transmit power, receive power, efficiency, gain, directivity, voltage standing wave ratio (VSWR), or the like.

At block 906, the one or more performance metrics of the AiP transceiver module are compared with one or more thresholds that specify a minimum level of performance. From block 906, the method 900 may proceed to block 908 in response to the performance metric exceeding the respective threshold for the minimum level of performance. Alternatively, the method 900 may proceed to block 910 in response to the performance metric failing to meet the respective threshold for the minimum level of performance.

At block 908, the AiP transceiver module passes testing for assembly in a user device. Based on the success of the AiP transceiver module in meeting on or more thresholds for the minimum level of performance, the AiP transceiver module is selected for assembly in a user device. At block 910, the AiP transceiver module fails testing that would qualify the module for assembly in the user device. Based on the failure to meet minimum levels of performance, the AiP transceiver module may be reset in the test fixture for re-testing, scrapped, or recycled.

Example Device

Figure 10:
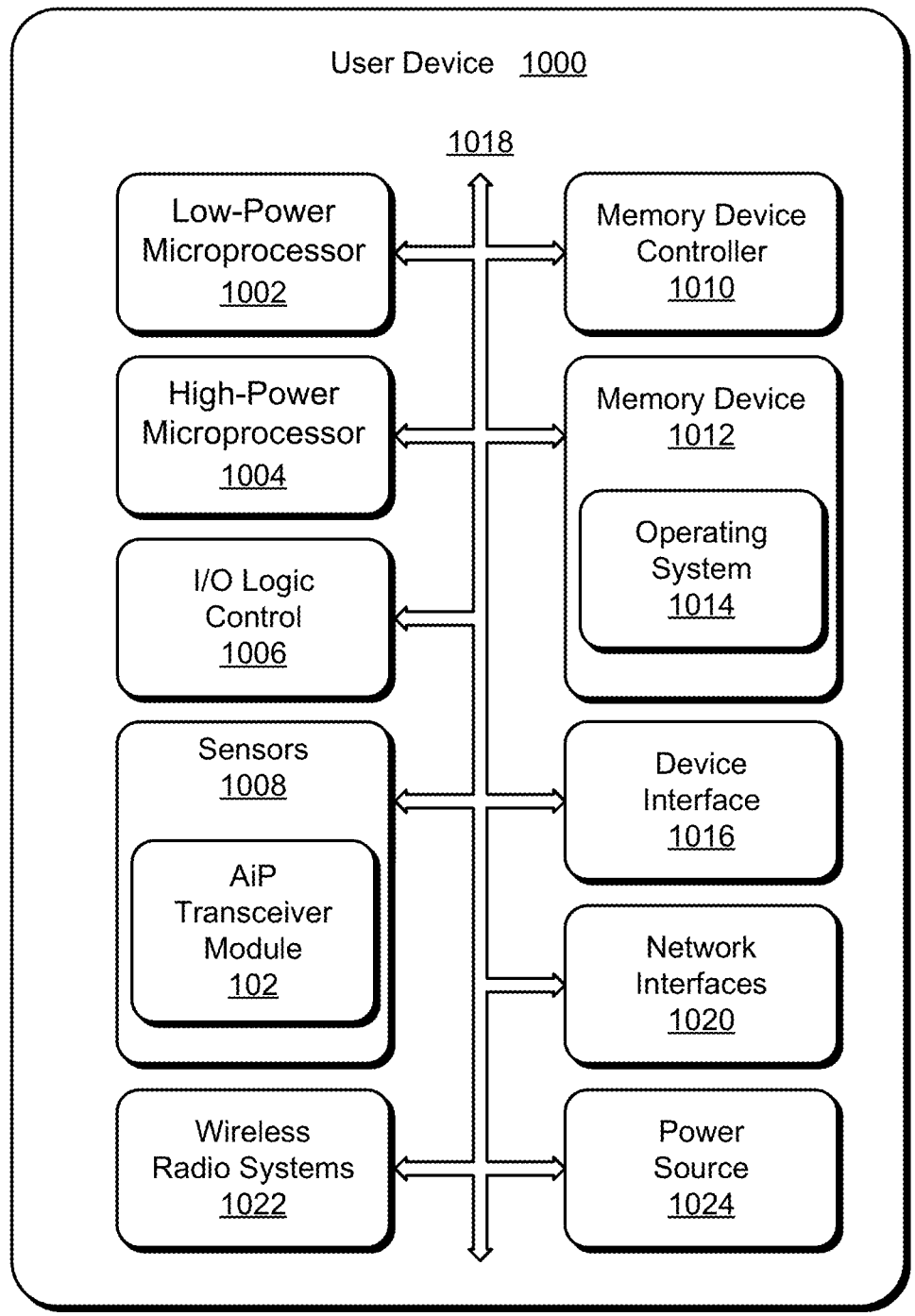
FIG. 10 depicts a block diagram of an example user device in which an AiP transceiver module can be implemented in accordance with one or more aspects described herein.

FIG. 10 illustrates various components of an example user device 1000 in which an AiP transceiver module can be implemented. The AiP transceiver module may be implemented in accordance with one or more aspects described with reference to FIGS. 1-7B and/or using the methods as described with FIG. 8 or FIG. 9. The components of the user device 1000 described with reference to FIG. 10 can be integrated with electronic circuitry, microprocessors, memory, input-output (I/O) logic control, communication interfaces and components, as well as other hardware, firmware, and/or software to implement the device in a user environment or wireless network.

In this example, the user device 1000 includes a low-power microprocessor 1002 and/or a high-power microprocessor 1004 (e.g., microcontrollers or digital signal processors) that process executable instructions. The device also includes an input-output (I/O) logic control 1006 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 1002 and the high-power microprocessor 1004 can also support one or more different device functionalities of the device. For example, the high-power microprocessor 1004 may execute computationally intensive operations (e.g., radar-enabled gesture detection), whereas the low-power microprocessor 1002 may manage less-complex processes such as detecting user presence with the AiP transceiver module 102 and/or one or more sensors 1008. The low-power microprocessor 1002 may also wake or initialize the high-power microprocessor 1004 for computationally intensive processes.

In aspects, the one or more sensors 1008 include an instance of the AiP transceiver module 102 to enable radar-based sensing of user interaction, which may include presence detection or gesture interaction. Generally, the sensors 1008 and the AiP transceiver module 102 may be included and implemented to detect various properties such as acceleration, temperature, humidity, water, supplied power, proximity, external motion, device motion, sound signals, ultrasound signals, light signals, fire, smoke, carbon monoxide, Global Navigation Satellite System (GNSS) signals, radio-frequency (RF), other electromagnetic signals or fields, or the like. As such, the sensors 1008 may include any one or a combination of temperature sensors, humidity sensors, hazard-related sensors, other environmental sensors, accelerometers, microphones, optical sensors up to and including cameras (e.g., charged coupled-device or video cameras), active or passive radiation sensors, GNSS receivers, and radio-frequency identification detectors. In implementations, the user device 1000 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The user device 1000 includes a memory device controller 1010 and a memory device 1012, such as any type of a nonvolatile memory and/or other suitable electronic data storage device. The user device 1000 can also include various firmware and/or software, such as an operating system 1014 that is maintained as computer-executable instructions by the memory and executed by a microprocessor. The device software may also include various radar-enabled applications for implemented radar features for user interaction. The user device 1000 also includes a device interface 1016 to interface with another device or peripheral component and includes an integrated data bus 1018 that couples the various components of the wireless user device for data communication between the components. The data bus in the wireless user device may also be implemented as any one or a combination of different bus structures and/or bus architectures.

The device interface 1016 may receive input from a user and/or provide information to the user (e.g., as a user interface), and a received input can be used to determine a setting. The device interface 1016 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 1016 may also receive inputs from any number of peripherals, such as buttons, a keypad, a switch, a microphone, and an imager (e.g., a camera device).

The user device 1000 can include network interfaces 1020, such as a wireless network interface for communication with other wireless user or network devices in a wireless network, and an external network interface for network communication, such as via the Internet. The user device 1000 also includes wireless radio systems 1022 for wireless communication with other wireless devices via the wireless network interface and for multiple, different wireless communications systems. The wireless radio systems 1022 may include Wi-Fi, Bluetooth™, Bluetooth™ Low Energy (BLE), Mobile Broadband, and/or point-to-point IEEE 802.15.4. Each of the different radio systems can include a radio device, antenna, and chipset that is implemented for a particular wireless communications technology. The user device 1000 also includes a power source 1024, such as a battery and/or to connect the device to line voltage. An AC power source may also be used to charge the battery of the device.

Although the above-described modules, configurations, methods, and devices are described in the context of an AiP transceiver module, the described modules, configurations, methods, or devices are non-limiting, and aspects thereof may apply to other contexts, systems, devices, radar transceivers, or wireless communication environments.

What is claimed is:

1. An Antenna-in-Package (AiP) transceiver module comprising:
   a substrate of dielectric material;
   a first layer of conductive material disposed on a first surface of the substrate, the first layer of conductive material including an antenna element, an antenna feed pad coupled to the antenna element, and a first set of pads coupled to respective ones of multiple vias that traverse the substrate;
   a transceiver integrated circuit (IC) die having respective contacts coupled to the antenna feed pad and at least some of the first set of pads of the first layer of conductive material;
   a second layer of conductive material disposed on a second surface of the substrate that is opposite to the first surface, the second layer of conductive material including a second set of pads coupled to respective ones of the multiple vias that traverse the substrate; and
   a dielectric interface area of the second surface of the substrate that is opposite to an area on the first surface of the substrate in which the antenna element is disposed, the second layer of conductive material not disposed within the dielectric interface area of the second surface of the substrate.

2. The AiP transceiver module of claim 1, wherein the dielectric interface area on the second surface of the substrate:
   includes at least one of the dielectric material of the substrate or a layer of another dielectric material; and
   does not include conductive material, conductive components, or conductive vias opposite to the area on the first surface of the substrate in which the antenna element is disposed.

3. The AiP transceiver module of claim 1, wherein:
   the antenna element is a first antenna element, the antenna feed pad is a first antenna feed pad, the dielectric interface area of the second surface of the substrate is a first dielectric interface area;
   first layer of conductive material further comprises a second antenna element and a second antenna feed pad coupled to the second antenna element, the respective contacts of the transceiver IC die are coupled to the first antenna feed pad and the second antenna feed pad; and
   the AiP transceiver module further comprises a second dielectric interface area of the second surface of the substrate that is opposite to an area on the first surface of the substrate in which the second antenna element is disposed, the second layer of conductive material not disposed within the second dielectric interface area of the second surface of the substrate.

4. The AiP transceiver module of claim 1, wherein the first layer of conductive material further comprises a ground plane formed around the first set of pads and at least some of the multiple vias that traverse the substrate, the ground plane electrically coupled by at least one of the multiple vias to a ground pad of the second set of pads disposed on the second surface of the substrate.

5. The AiP transceiver module of claim 4, wherein the ground plane of the first conductive layer does not extend to or around the area in which the antenna element is disposed on the first surface of the substrate.

6. The AiP transceiver module of claim 1, wherein the antenna element comprises one of a microstrip antenna, a patch antenna, a rectangular patch antenna, a planar inverted-F antenna, a folded inverted conformal antenna, or an inset fed patch antenna.

7. The AiP transceiver module of claim 1, wherein:
   the substrate of dielectric material comprises a laminated printed circuit board (PCB) substrate;
   the first layer of conductive material is first layer of copper circuitry disposed on the first surface of the PCB substrate; and
   the second layer of conductive material is a second layer of copper circuitry disposed on the second surface of the PCB substrate.

8. The AiP transceiver module of claim 7, wherein the laminated PCB substrate, first layer of copper circuitry, and second layer of copper circuitry form a two-layer PCB to which the respective contacts of the transceiver IC die are soldered.

9. The AiP transceiver module of claim 8, wherein a thickness of the two-layer PCB of the AiP transceiver module is between 100 micrometers and 300 micrometers.

10. The AiP transceiver module of claim 8, wherein:
   the respective contacts of the transceiver IC die include a ground contact, a power contact, and at least two data interface contacts;
   the second set of pads of the second layer of conductive material include a ground pad, a power pad, and at least two data interface pads; and
   the ground contact, the power contact, and the at least two data interface contacts of the transceiver IC die are electrically coupled to the ground pad, the power pad, and the at least two data interface pads of the second layer of conductive material disposed on the second surface of the substrate.

11. The AiP transceiver module of claim 10, wherein:
   the ground pad, the power pad, and the at least two data interface pads of the second layer of conductive material have a minimum pitch spacing of at least 450 micrometers; or
   the ground pad, the power pad, or the at least two data interface pads of the second layer of conductive material include circular solder pads or round solder pads.

12. An apparatus comprising:
   a printed circuit board (PCB) that includes a first set of pads disposed on a first layer of the PCB and a conductive area disposed between at least two pads of the first set of pads;
   solder balls coupled to the first set of pads, each of the solder balls coupled to a respective one of the first set of pads disposed on the first layer of the PCB; and
   an antenna-in-package (AiP) transceiver module coupled to the PCB by the solder balls, the AiP transceiver module comprising:
      a substrate of dielectric material;
      a transceiver integrated circuit (IC) disposed on a first surface of the substrate;
      an antenna element disposed on the first surface of the substrate and coupled to the transceiver IC die;
      a second set of pads disposed on a second surface of the substrate, each of the solder balls coupled to a respective one of the second set of pads disposed on the second surface of the substrate; and
      a dielectric interface area of the second surface of the substrate disposed between at least two pads of the second set of pads, the dielectric interface area being opposite an area on the first surface of the substrate in which the antenna element is disposed.

13. The apparatus of claim 12, wherein the dielectric interface area of the second surface of the substrate of the AiP transceiver module is positioned between the antenna element of the AiP transceiver module and the conductive area of the PCB.

14. The apparatus of claim 13, wherein the conductive area of the PCB is a ground plane disposed on the first layer of the PCB.

15. The apparatus of claim 14, wherein a volume of space between the dielectric interface area of the AiP transceiver module and the ground plane of the PCB does not include conductive material or conductive components.

16. The apparatus of claim 15, wherein:
a height of the volume of space between the dielectric interface area of the AiP transceiver module and the ground plane of the PCB is at least 400 micrometers; and
a thickness of the substrate of the AiP antenna module is between 100 micrometers and 300 micrometers.

17. The apparatus of claim 15, wherein a diameter of the solder balls coupled between the AiP transceiver module and the PCB is between 350 micrometers and 450 micrometers.

18. The apparatus of claim 17, wherein:
a pitch of the first set of pads disposed on the first layer of the PCB is between 450 micrometers and 550 micrometers; or
a pitch of the second set of pads disposed on the second surface of the substrate of the AiP transceiver module is between 450 micrometers and 550 micrometers.

19. The apparatus of claim 12, wherein:
the first set of pads disposed on the first layer of the PCB include at least one ground pad, at least one power pad, and at least two interface pads; or
the second set of pads disposed on the second surface of the substrate of the AiP transceiver module include at least one ground pad, at least one power pad, and at least two interface pads.

20. The apparatus of claim 12, wherein:
the first set of pads disposed on the first layer of the PCB includes a subset of pads that are not electrically coupled to a ground reference, power reference, or signal trace of the PCB; or
the second set of pads disposed on the second surface of the substrate of the AiP transceiver module includes a subset of pads that are not electrically coupled to a ground reference, power reference, or signal trace of the AiP transceiver module.

* * * * *